US012621310B2

(12) United States Patent
Harris et al.

(10) Patent No.: US 12,621,310 B2
(45) Date of Patent: May 5, 2026

(54) EVENT MONITORING AND RESPONSE SYSTEM AND METHOD

(71) Applicant: Visa International Service Association, San Francisco, CA (US)

(72) Inventors: Theodore D. Harris, San Francisco, CA (US); Craig O'Connell, San Mateo, CA (US); Yue Li, Sunnyvale, CA (US); Tatiana Korolevskaya, Mountain View, CA (US); Nancy Switzer, Pacifica, CA (US); Aoyu Chen, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 1231 days.

(21) Appl. No.: 17/052,291

(22) PCT Filed: May 2, 2019

(86) PCT No.: PCT/US2019/030447
§ 371 (c)(1),
(2) Date: Nov. 2, 2020

(87) PCT Pub. No.: WO2019/213426
PCT Pub. Date: Nov. 7, 2019

(65) Prior Publication Data
US 2021/0176262 A1     Jun. 10, 2021

Related U.S. Application Data

(60) Provisional application No. 62/665,889, filed on May 2, 2018.

(51) Int. Cl.
H04L 9/40 (2022.01)
G06N 20/00 (2019.01)
(Continued)

(52) U.S. Cl.
CPC ......... H04L 63/1416 (2013.01); G06N 20/00 (2019.01); G06Q 20/4016 (2013.01); G06N 3/08 (2013.01)

(58) Field of Classification Search
CPC . H04L 63/1416; G06N 20/00; G06Q 20/4016
See application file for complete search history.

(56) References Cited

U.S. PATENT DOCUMENTS 7,793,835 B1    9/2010   Coggeshall et al.
9,336,315 B2    5/2016   Ovsjanikovs et al.
(Continued)

OTHER PUBLICATIONS

Fast Tensor Factorization for Accurate Internet Anomaly Detection taken from https://www.computer.org/csdl/journal/nt/2017/06/08089452/13rRUwInvpl Dec. 2017, pp. 3794-3807, 14 pages (Year: 2017).*

(Continued)

*Primary Examiner* — William L Bashore
*Assistant Examiner* — Gregory A Distefano
(74) *Attorney, Agent, or Firm* — Kilpatrick Townsend & Stockton LLP

(57) ABSTRACT

A method includes a processing computer querying a data store for plurality of network data since a last epoch of data. The processing computer can generate matrices based on the plurality of network data and then perform tensor factorization on the matrices, to obtain latent values in the network data. The processing computer can then determine that the latent values satisfy a predetermined criterion. The processing computer can input the latent values into a model associated with the signal, wherein the model generates output data. The processing computer can then generate an alert comprising the output data and then transmit the alert to a remote server computer.

14 Claims, 10 Drawing Sheets

(51) Int. Cl.
    G06Q 20/40     (2012.01)
    *G06N 3/08*     (2023.01)

(56)         References Cited

U.S. PATENT DOCUMENTS

| | | | |
|---|---|---|---|
| 9,875,347 B2 * | 1/2018 | Baghdasaryan | ...... G06F 21/316 |
| 2008/0208966 A1 * | 8/2008 | Edwards | .............. H04L 51/212 |
| | | | 709/203 |
| 2012/0278021 A1 | 11/2012 | Lin et al. | |
| 2014/0058763 A1 | 2/2014 | Zizzamia et al. | |
| 2016/0132886 A1 * | 5/2016 | Burke | ................ G06Q 20/3827 |
| | | | 705/44 |
| 2017/0364534 A1 | 12/2017 | Zhang et al. | |
| 2018/0082189 A1 * | 3/2018 | Cormier | ................. G06N 5/022 |
| 2018/0302425 A1 * | 10/2018 | Esman, Sr. | ......... H04L 63/1433 |
| 2019/0149565 A1 * | 5/2019 | Hagi | ...................... G06N 3/042 |
| | | | 726/23 |
| 2020/0029218 A1 * | 1/2020 | Hagey | ................. H04W 12/122 |
| 2020/0053110 A1 * | 2/2020 | Wan | ...................... H04L 67/535 |

OTHER PUBLICATIONS

Application No. PCT/US2019/030447 , International Search Report and Written Opinion, Mailed on Aug. 13, 2019, 10 pages.

* cited by examiner

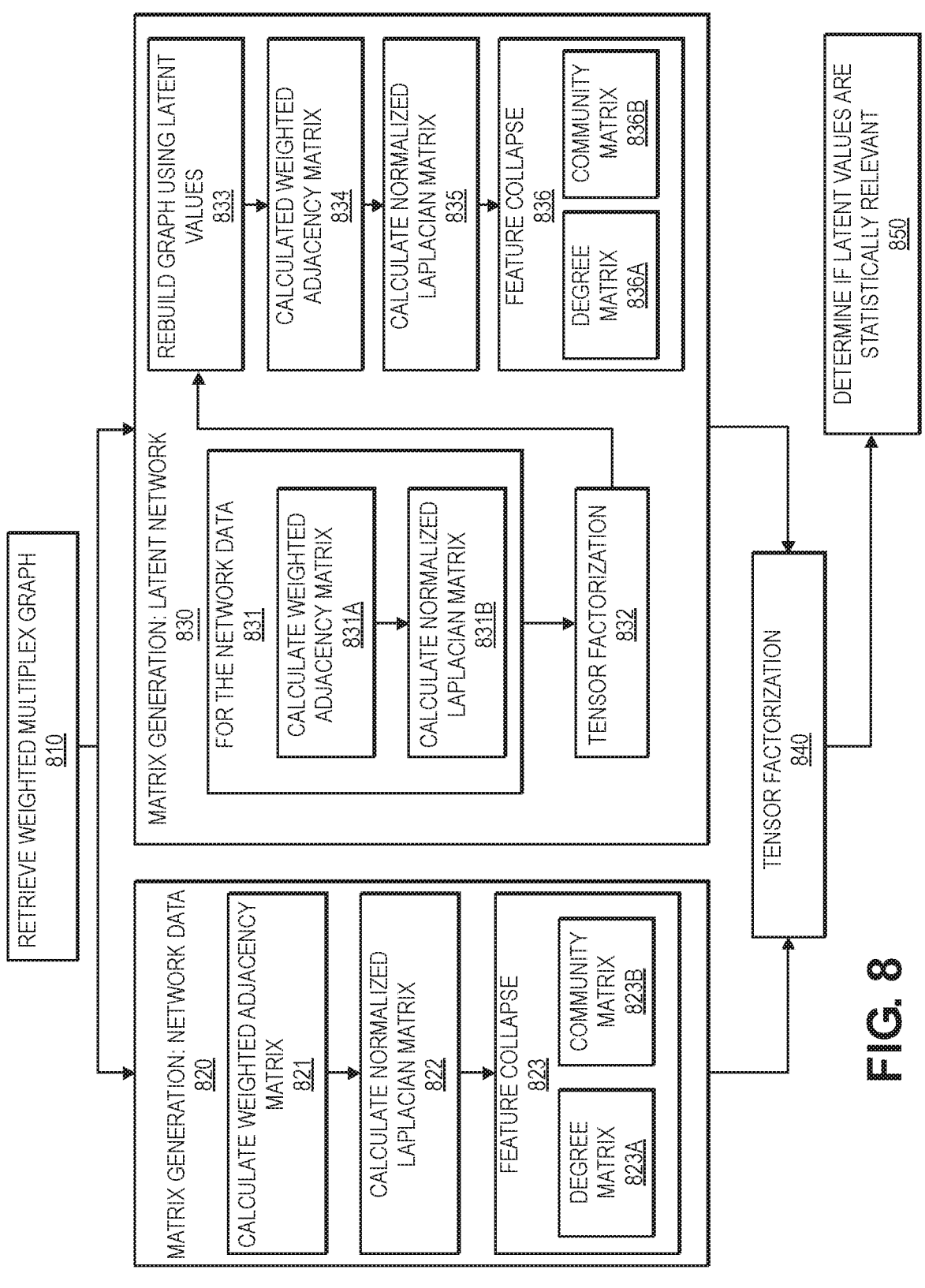

RETRIEVE WEIGHTED MULTIPLEX GRAPH
810

MATRIX GENERATION: NETWORK DATA
820

CALCULATE WEIGHTED ADJACENCY MATRIX
821

CALCULATE NORMALIZED LAPLACIAN MATRIX
822

FEATURE COLLAPSE
823

DEGREE MATRIX
823A

COMMUNITY MATRIX
823B

MATRIX GENERATION: LATENT NETWORK
830

FOR THE NETWORK DATA
831

CALCULATE WEIGHTED ADJACENCY MATRIX
831A

CALCULATE NORMALIZED LAPLACIAN MATRIX
831B

TENSOR FACTORIZATION
832

REBUILD GRAPH USING LATENT VALUES
833

CALCULATED WEIGHTED ADJACENCY MATRIX
834

CALCULATE NORMALIZED LAPLACIAN MATRIX
835

FEATURE COLLAPSE
836

DEGREE MATRIX
836A

COMMUNITY MATRIX
836B

TENSOR FACTORIZATION
840

DETERMINE IF LATENT VALUES ARE STATISTICALLY RELEVANT
850

FIG. 8

ADJACENCY MATRIX
1010

$$\begin{pmatrix} 2 & 1 & 0 & 0 & 1 & 0 \\ 1 & 0 & 1 & 0 & 1 & 0 \\ 0 & 1 & 0 & 1 & 0 & 0 \\ 0 & 0 & 1 & 0 & 1 & 1 \\ 1 & 1 & 0 & 1 & 0 & 0 \\ 0 & 0 & 0 & 1 & 0 & 0 \end{pmatrix}$$

1000

Coordinates are 1-6.

DEGREE MATRIX
1020

$$\begin{pmatrix} 4 & 0 & 0 & 0 & 0 & 0 \\ 0 & 3 & 0 & 0 & 0 & 0 \\ 0 & 0 & 2 & 0 & 0 & 0 \\ 0 & 0 & 0 & 3 & 0 & 0 \\ 0 & 0 & 0 & 0 & 3 & 0 \\ 0 & 0 & 0 & 0 & 0 & 1 \end{pmatrix}$$

LAPLACIAN MATRIX
1030

$$\begin{pmatrix} 2 & -1 & 0 & 0 & -1 & 0 \\ -1 & 3 & -1 & 0 & -1 & 0 \\ 0 & -1 & 2 & -1 & 0 & 0 \\ 0 & 0 & -1 & 3 & -1 & -1 \\ -1 & -1 & 0 & -1 & 3 & 0 \\ 0 & 0 & 0 & -1 & 0 & 1 \end{pmatrix}$$

EVENT MONITORING AND RESPONSE SYSTEM AND METHOD

CROSS-REFERENCES TO RELATED APPLICATIONS

This application is a 371 National Stage of International Application No. PCT/US2019/030447, International Filing Date May 2, 2019, which claims the benefit of U.S. Provisional Application No. 62/665,889, filed May 2, 2018, which is are herein incorporated by reference in their entirety for all purposes.

BACKGROUND

A server computer can search through the incoming data using hard coded filters to determine if any signals are present in the data. As an illustration, a server computer can analyze incoming transaction data for transactions. The server computer can use a filter (e.g., a threshold) to determine if one or more parameters associated with one or more transactions meet the filter. If one or more parameters associated with the transactions meet the filter, then the server computer can issue an appropriate alert. For example, a server computer can analyze transaction data for a number of transactions using a static filter which flags potentially fraudulent activity when two or more high value (e.g., more than $500) transactions conducted using the same account occur within a 48 hour period at two merchants selling similar goods (e.g., two electronics stores). This particular filter can be used to identify abnormal and potentially fraudulent activity.

While effective in some instances, static filters can be problematic, because static filters are relative inflexible. Because they are inflexible, they may fail to identify relevant, but subtle, trends in a data set. For example, the static filter which flags potentially fraudulent activity when two or more high value (e.g., more than $500) transactions conducted using the same account occur within a 48 hour period at two merchants selling similar goods may improperly identify legitimate transactions as being potentially fraudulent. For example, consider a non-fraudulent scenario where a merchant that sells expensive and popular dresses is having a sale, and the purchase of such dresses by consumers often results in those consumers buying expensive accessories at other merchants (such as merchants that sell expensive shoes). This scenario may satisfy the filter, but the identification of two such transactions as being potentially fraudulent would end up being a false positive, since the transactions would be legitimate.

While one could hard code many filters to cover may different potential situations, it is often not practical to predict each and every situation that might occur with respect to a particular set of outcomes. Thus, improved analysis methods for monitoring events are needed.

Embodiments of the invention address this problem and other problems individually and collectively.

SUMMARY

One embodiment of the invention is directed to a method comprising: querying, by a processing computer, a data store for a plurality of network data since a last epoch of data; generating, by the processing computer, matrices based on the plurality of network data; performing, by the processing computer, tensor factorization on the matrices to obtain latent values in the plurality of network data; determining, by the processing computer, that the latent values satisfy a predetermined criterion; inputting, by the processing computer, the latent values into a model, wherein the model generates output data; generating, by the processing computer, an alert comprising the output data; and transmitting, by the processing computer, the alert to a remote server computer.

Another embodiment of the invention is directed to a processing computer comprising: a processor; a memory device; and a computer-readable medium coupled to the processor, the computer-readable medium comprising code executable by the processor for implementing a method comprising: querying a data store for a plurality of network data since a last epoch of data; generating matrices based on the plurality of network data; performing tensor factorization on the matrices to obtain latent values in the plurality of network data; determining that the latent values satisfy a predetermined criterion; inputting the latent values into a model, wherein the model generates output data; generating an alert comprising the output data; and transmitting the alert to a remote server computer.

Another embodiment is directed to a method comprising: generating, by a remote server computer, an event request message comprising event data related to a user; transmitting, by the remote server computer, the event request message to a processing computer, wherein the processing computer determines a model associated with the event data, wherein the model is trained, in part, using latent values, runs the model on the event data to determine output data, and transmits an event response message comprising the output data to the remote server computer; receiving, by the remote server computer, the event response message; and performing, by the remote server computer, additional processing based upon the event response message.

Another embodiment of the invention is directed to a remote server computer comprising: a processor; a memory device; and a computer-readable medium coupled to the processor, the computer-readable medium comprising code executable by the processor for implementing a method comprising: generating an event request message comprising event data related to a user; transmitting the event request message to a processing computer, wherein the processing computer determines a model associated with the event data, wherein the model is trained, in part, using latent values, runs the model on the event data to determine output data, and transmits an event response message comprising the output data to the remote server computer; receiving the event response message; and performing additional processing based upon the event response message.

Further details regarding embodiments of the invention can be found in the Detailed Description and the Figures.

3

4

Figure 7:
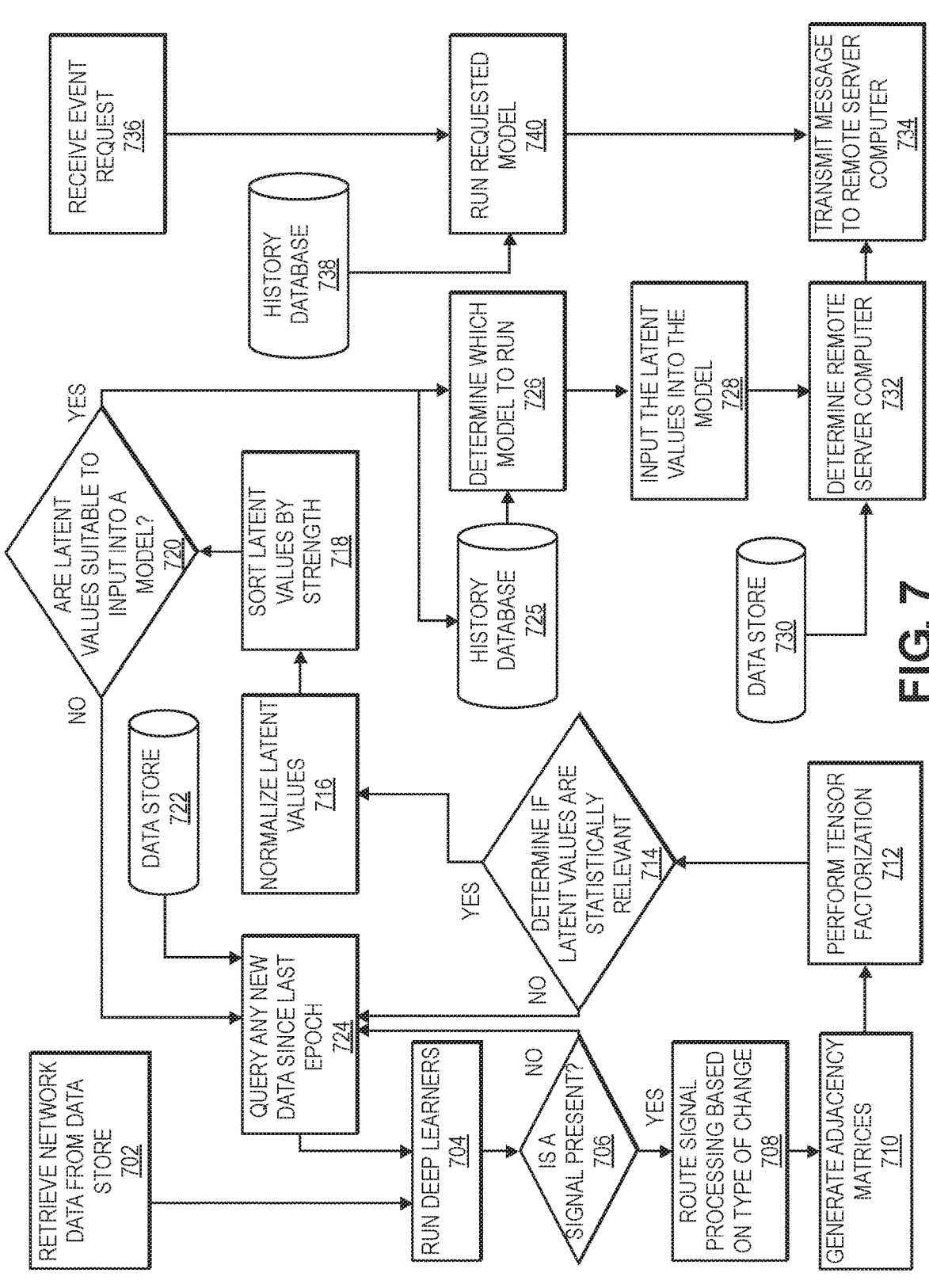

FIG. 7 shows a method of processing a request according to embodiments.

FIG. 8 shows a latent space model for a dynamic multiplex network with impostor vertices using three-way tensor factorization according to embodiments.

Figure 9:
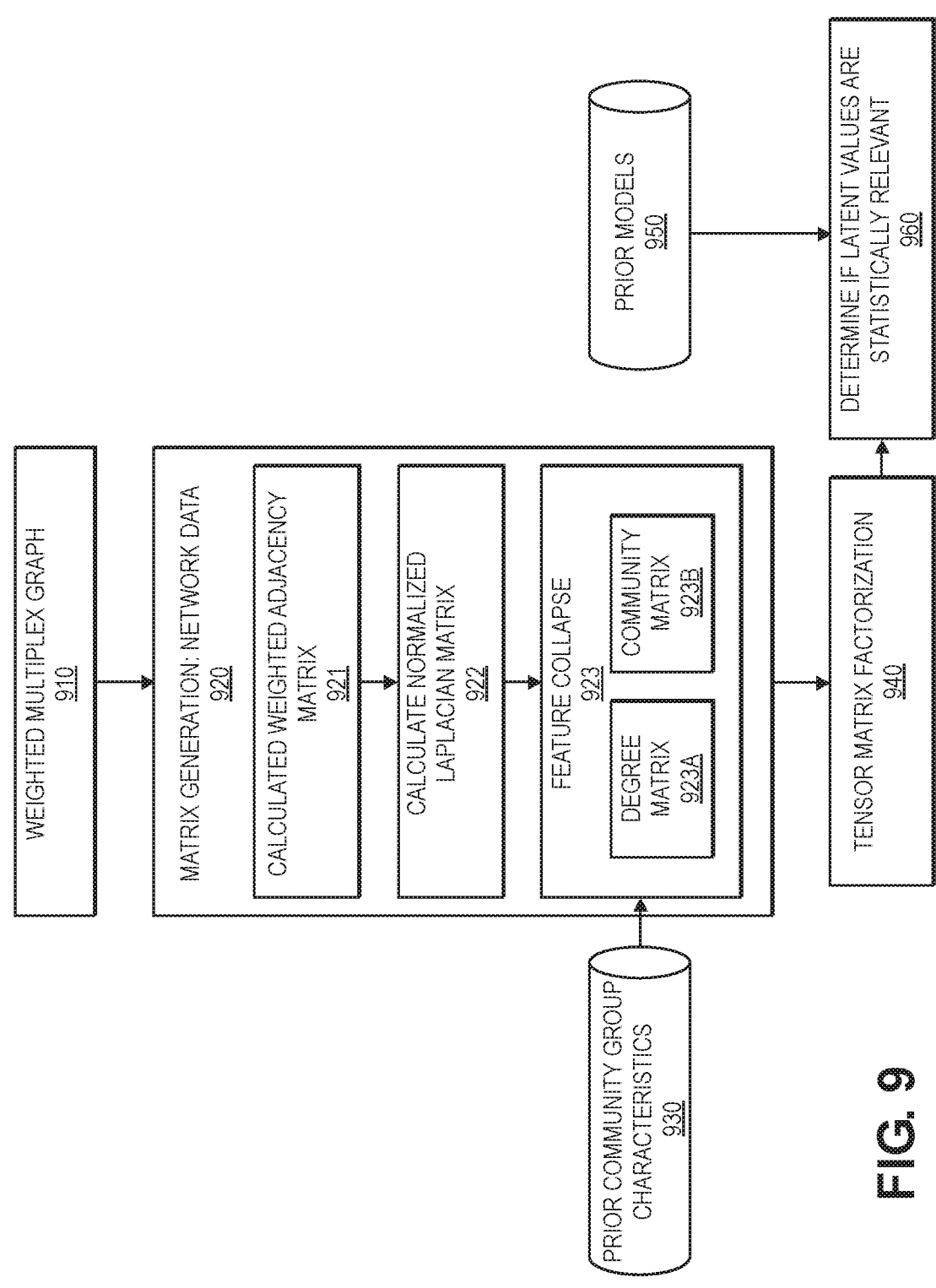

FIG. 9 shows a tensor factorization process according to embodiments.

Figure 10:
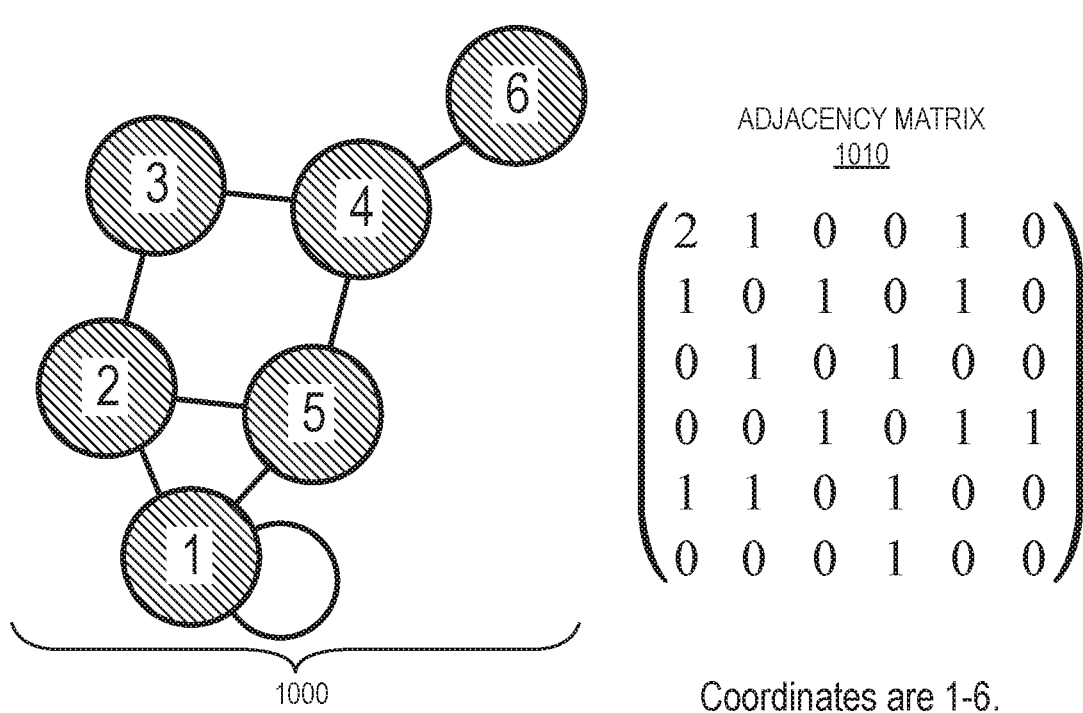

FIG. 10 shows example matrices according to embodiments.

DETAILED DESCRIPTION

Prior to discussing embodiments, some terms can be described in further detail.

A "model" can include a system of postulates, data, and/or inferences presented as a mathematical description. A model can reproduce the behavior of a system to simulate outcomes of a mathematical model of the system. Models can be of different types, for example, stochastic or deterministic models, steady-state or dynamic models, and continuous or discrete models. In some embodiments, a model can be a dynamic system simulation which can model the varying behavior of a system (e.g., a water supply system model). In other embodiments, a model can include an AI model.

The term "artificial intelligence model" or "AI model" can include a model that may be used to predict outcomes in order achieve a target goal. The AI model may be developed using a learning algorithm, in which training data can be classified based on known or inferred patterns. One type of AI model may be a "machine learning model."

"Machine learning" can include an artificial intelligence process in which software applications may be trained to make accurate predictions through learning. The predictions can be generated by applying input data to a predictive model formed from performing statistical analysis on aggregated data. Machine learning that involves learning patterns from a topological graph can be referred to as "graph learning."

"Unsupervised learning" can include a type of learning algorithm used to classify information in a dataset by labeling inputs and/or groups of inputs. One method of unsupervised learning can be cluster analysis, which can be used to find hidden patterns or grouping in data. The clusters may be modeled using a measure of similarity, which can defined using one or metrics, such as Euclidean distance.

A "topological graph" can include a representation of a graph in a plane of distinct vertices connected by edges. The distinct vertices in a topological graph may be referred to as "nodes." Each node may represent specific information for an event or may represent specific information for a profile of an entity or object. The nodes may be related to one another by a set of edges, E. An "edge" may be described as an unordered pair composed of two nodes as a subset of the graph G=(V, E), where is G is a graph comprising a set V of vertices (nodes) connected by a set of edges E. For example, a topological graph may represent a transaction network in which a node representing a transaction may be connected by edges to one or more nodes that are related to the transaction, such as nodes representing information of a device, a user, a transaction type, etc. An edge may be associated with a numerical value, referred to as a "weight", that may be assigned to the pairwise connection between the two nodes. The edge weight may be identified as a strength of connectivity between two nodes and/or may be related to a cost or distance, as it often represents a quantity that is required to move from one node to the next.

"Network data" can include a network of data. In some embodiments, network data may be in the form of a graph and a plurality of network data can make up a multiplex graph, which may be represented by a higher-order tensor. Network data can include any suitable data (e.g., fraud network data, transaction network data, weather network data, etc.).

A "multiplex graph" may be a graph where edges between nodes can be of different types. A multiplex graph can comprise a plurality of network data. For example, a multiplex graph can include fraud network data, weather network data, purchase network data where the type of edges may differ between each network data in the multiplex graph. For example, the edges between nodes in the fraud network data may connect nodes with similar fraud characteristics, whereas the edges in the weather network may connect weather measurements from various weather stations. Further, nodes in different network data can be connected by edges. For example, a node in the fraud network data may be connected via an edge to a node in the weather network data. These nodes may be connected, for example, if the fraud node indicates a fraudulent transaction that occurred during a particular weather event such as a hurricane. The fraud node may connect to the relevant hurricane node. As another example, the nodes of the purchase network data may connect to the nodes of the fraud network data. A particular node of the purchase network data may indicate that a consumer, John, purchased a lawnmower at a hardware store for $399. This node indicating the purchase of the lawnmower may be related to a fraud node in the fraud network data. For example, John may not have actually purchased the lawnmower, his credit card may have been stolen, and the fraudster may have purchased the lawnmower.

A "subgraph" or "sub-graph" can include a graph formed from a subset of elements of a larger graph. The elements may include vertices and connecting edges, and the subset may be a set of nodes and edges selected amongst the entire set of nodes and edges for the larger graph. Each subgraph can overlap another subgraph formed from the same larger graph.

A "community" can include a group/collection of nodes in a graph that are densely connected within the group. A community may be a subgraph or a portion/derivative thereof and a subgraph may or may not be a community and/or comprise one or more communities. A community may be identified from a graph using a graph learning algorithm, such as a graph learning algorithm for mapping protein complexes. Communities identified using historical data can be used to classify new data for making predictions. For example, identifying communities can be used as part of a machine learning process, in which predictions about information elements can be made based on their relation to one another. For example, nodes with similar characteristics (e.g., locations, temperatures, colors, etc.) can be clustered into a community. New nodes may later be compared to the community groups to predict which community the new nodes should be associated with. For further details on community group determination see [Fortunato, Santo. "Community detection in graphs." *Physics reports* 486.3-5 (2010): 75-174.] which is incorporated herein for all purposes. Community groups are also described in detail in WO 2018/013566, corresponding to PCT application no. PCT/US2017/041537, filed on Jul. 11, 2017, which is herein incorporated by reference in its entirety.

An "epoch" can include one complete presentation of a data set to be learned by a learning machine. For example, learning machines such as feedforward neural networks can use iterative algorithms and can train with a plurality of epochs during a learning phase. An epoch can correspond to data included in any suitable timespan (e.g., 30 minutes, 3 hours, 1 day, etc.).

An "adjacency matrix" can include a matrix used to represent a finite graph. The elements of the matrix can indicate whether pairs of vertices are adjacent or not adjacent in the graph. An adjacency matrix may be a square matrix. For example, for a graph with vertex set V, the adjacency matrix can be a square $|V| \times |V|$ matrix A such that its element $A_{ij}$ is one when there is an edge from vertex (i.e., node) i to vertex j, and zero when there is no edge between vertex i and vertex j. The diagonal elements of the matrix may all be equal to zero, if no edges from a vertex to itself (i.e., loops) are included in the graph. The same concept can be extended to multigraphs and graphs with loops by storing the number of edges between each two vertices in the corresponding matrix element, and by allowing nonzero diagonal elements. Loops may be counted either once (as a single edge) or twice (as two vertex-edge incidences), as long as a consistent convention is followed. Undirected graphs often use the latter convention of counting loops twice, whereas directed graphs typically use the former convention.

A "degree matrix" can include a matrix which contains information about a degree of each vertex of a graph. The information about a degree of each vertex can include the number of edges attached to each vertex (i.e., a node in a graph). For example, if a node is connected to three other nodes, via three edges, then the degree of said node can be equal to three. In some embodiments, an adjacency matrix and a degree matrix can be used together to construct a Laplacian matrix of a graph. A degree matrix may be a diagonal matrix. For example, given a graph G=(V, E) where V are the vertices (i.e., nodes) and E are the edges, and where the magnitude of V is equal to the total number of nodes n, the degree matrix D for the graph G can be a n×n diagonal matrix. In some embodiments, if the graph is an undirected graph, each loop (e.g., a node connects to itself via an edge) increases the degree of a node by two. In a directed graph, either an indegree (i.e., the number of incoming edges at each node) or an outdegree (i.e., the number of outgoing edges at each node) may be used to mean the degree of a node.

A "tensor" can be a mathematical object represented by an array of components. A tensor can map, in a multi-linear manner, geometric vectors, scalars, and other tensors to a resulting tensor. A tensor can have a rank. A rank 1 tensor may be a vector. A rank 2 tensor may be a matrix. Tensors of rank 3 or higher may be referred to as higher order tensors.

"Tensor factorization" or "tensor decomposition" can be a process for expressing a tensor as a sequence of elementary operations acting on other, typically simpler, tensors. Tensor factorization may be capable of learning connections among known values in a tensor in order to infer missing or latent values. For example, tensor factorization may decompose a tensor into multiple low-rank latent factor matrices representing each tensor-dimension. In some embodiments, tensor factorization can include Tucker decomposition. For further details on tensor factorization as well as its application to latent variables can be found in, for example, [Kolda, Tamara G., and Brett W. Bader. "Tensor decompositions and applications." *SIAM review* 51.3 (2009): 455-500.], and [Rabanser, Stephen, et al. "Introduction to Tensor Decompositions and their Applications in Machine Learning" in ArXiv (2017)], which are herein incorporated by reference in their entirety for all purposes. Further, examples of probabilistic latent tensor factorization for audio modeling can be found in, for example, [Cemgil, Ali Taylan, et al. "Probabilistic latent tensor factorization framework for audio modeling." 2011 *IEEE Workshop on Applications of Signal Processing to Audio and Acoustics* (*WASPAA*). IEEE, 2011.], which is herein incorporated by reference in its entirety for all purposes.

A "latent variable" or "latent attribute" may include data that is not directly observed or measured. A latent variable may be inferred from other variables that are observed or measured. In some cases a latent variable may correspond to an aspect of physical reality, which could in principle be measured or observed, but may not for practical reasons. Examples of latent variables include risk scores, categories (e.g., literature, sports, foods, etc.), data structures, etc. In some embodiments, a processing computer can determine a tensor comprising one or more latent variables. A latent variable can be a numeric value derived from a plurality of network data. Additional examples of latent variables can include, for example, network risk (e.g., fraud origination), situation data (e.g., high foot traffic), environmental factors (e.g., hurricane impact), economic heath (e.g., regional trends), device characteristics (e.g., fraud farm characteristics), user characteristics (e.g., mood, propensity, etc.), community (e.g., increase risk of exposure), fraud activity (e.g., daily fraud rate), resource provider characteristics (e.g., volumes), etc.

A "latent value" can include a value of a latent variable. For example, a latent variable may be predicted water usage, and the corresponding latent value may be 10 gallons. As another example, a latent variable may be an estimated fraudster, and the corresponding latent value may have multiple data items, for example, a location (e.g., coordinates), a method of fraud (e.g., credit card, check, etc.) which may be represented by integers, a rate of attempted fraud (e.g., 2 times per day), and other suitable values used to estimate a fraudulent party. In the description above in the background, the latent variable can be a promotional sale which can indicate whether or not the resource provider is having a sale. The associated latent values can be, for example, a 1 indicating, a sale or a 0, indicating no sale.

For example, a plurality of network data can include weather data and economic data. A latent variable determined from the weather data and the economic data can include energy consumption. For example, if the weather data indicates that the weather is hotter and the economic data indicates a region (e.g., a neighborhood) of wealthy individuals, then the determined latent variable of energy consumption can be a large value (e.g., 1000 kilowatts for the neighborhood). As another example, latent variables determined from the weather data and the economic data can include, but are not limited to, economic recovery timelines from natural disasters, effect of weather conditions on fraudulent activities, probability of events during particular weather conditions, etc.

"Output data" can include data that is output by a computer or software in response to input data. In some embodiments, output data may be determined and/or output by a machine learning model. The output data can depend on the type of machine learning (ML) model. For example, the output data can be a single value if the ML model is a regression model, n classes and a probability that the input is of a class if the ML model is a classification model, a string including a word, a character, a sentence, etc. if the ML model is a text summarization model, etc.

A "signal" can include information about a behavior and/or attributes of some phenomenon. A signal can include a difference in consecutively determined output data. For example, first output data may indicate community groups from network data. The first output data can be compared with second output data, which may also indicate community groups, to determine any changes in community groups (i.e., a signal).

An "interaction" may be a reciprocal action that involves more than one actor. For example, an interaction between devices can include the exchange of data. As another example, interactions between consumers and resource providers can be referred to as "transactions."

A "criterion" can include a principle or standard by which something may be judged and/or decided. For example, a criterion can include a standard that determined latent values are statistically relevant.

"Additional processing" can include performing one or more processes. In some embodiments, a processing computer can perform additional processing based on determined output data (e.g., output from a model). In other embodiments, a remote server computer can perform additional processing. Additional processing can include any suitable processing capable of being performed by the processing computer. Additional processing may also include performing an action, such as the manipulation of a mechanical actuator, additional analysis or computation, initiation or termination of an action, etc. As further examples, additional processing can include updating routing tables, performing a fraud analysis, performing further analysis on the latent values and/or output data, and/or other processing based on the output of the model. In some embodiments, additional processing can include opening and/or closing water system valves and/or generating documents (e.g., legal documents, car related documents, automated reports and/or audits, etc.).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "processor" can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Embodiments allow for a system and method configured to efficiently determine latent values from a plurality of network data in a continuous process. A processing computer can query a data store for plurality of network data and generate adjacency matrices based on the plurality of network data. The processing computer can then perform tensor factorization on at least the adjacency matrices to obtain latent values in the network data. After obtaining the latent values, the processing computer can determine if the latent values satisfy a predetermined criterion. The processing computer can then input the latent values into a model that generates output data. The processing computer can then generate an alert based comprising the output data and transmit the alert to a remote server computer.

As an illustrative example, the processing computer can query the data store for a plurality of network data comprising weather network data, car traffic network data, and communication traffic network data. For example, the weather network data may include wind speeds, temperatures, and pressures. The car traffic network data may include average car speeds, length of idle time, and car densities (i.e., how close cars are to one another). The communication traffic network data may include communication durations, communication failure rates, communication channel types (i.e., cellular phone communication, internet communication, SMS communication, etc.), and communication rates of particular machines. The processing computer can then generate adjacency matrices based on the plurality of network data and perform tensor factorization on at least the adjacency matrices to obtain latent values for the latent variables of sales and/or expected water usage. The plurality of network data may indicate that a hurricane is approaching Florida (e.g., in the weather network data) and that car traffic has increased significantly as people leave the predicted hurricane landfall site. Additionally, communication traffic may greatly increase as people attempt to contact relatives and friends. The determined latent values from this example set of data may be expected water usage rates in various locations in and around the predicted hurricane landfall site. For example, the latent variable may be expected water usage (drinking water) and the determined latent values may be 5 gallons, 10 gallons, 45 gallons, and 90 gallons, where each latent value may correspond to a different location in the area. Knowing expected water usage can be beneficial during a hurricane, since hurricanes, especially if accompanied by a tidal surge or flooding, can contaminate susceptible water supplies.

The processing computer can then determine whether or not these latent values are statistically relevant, for example, by comparing the latent values to known historical values. If one or more latent values are statistically relevant, then the processing computer can input the latent values into a model. For example, the model may be a water supply system model that accepts inputs of expected water usage. The model can determine output data, which may include an efficient way to route water through the water supply system so that the locations expecting increased water usage can get access to the necessary water during the hurricane. The processing computer can generate an alert to the water supply system which may implement changes in the water supply system (e.g., altering pressures, routing water flow, etc.) so that people can receive safe drinking water throughout, and during the aftermath of, the hurricane.

I. Systems

Embodiments are usable with various data processing systems, e.g., payments systems, weather systems, scientific systems, fraud systems, and the like. Although examples of fraud systems are described, embodiments are equally applicable for other data processing systems.

A. Overview

Figure 1:
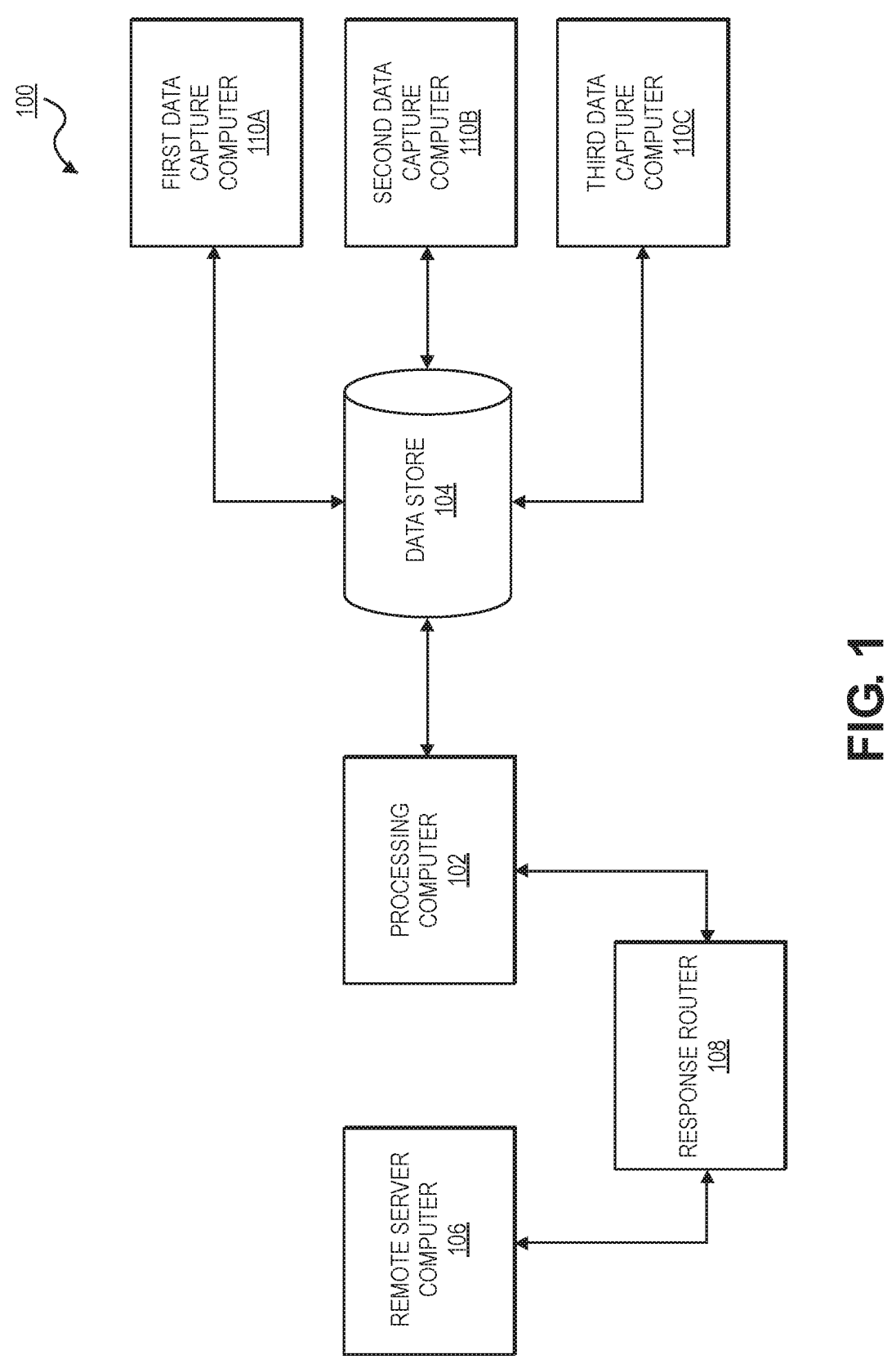
FIG. 1 shows a block diagram of a system according to embodiments.

FIG. 1 shows a system 100 comprising a number of components according to embodiments. The system 100 comprises a processing computer 102, a data store 104, a remote server computer 106, a response router 108, and a plurality of data capture computers comprising a first data capture computer 110A, a second data capture computer 1106, and a third data capture computer 110C. The processing computer 102 may be in operative communication with the data store 104 and the response router 108. In some embodiments, the processing computer 102 may be in operative communication with the remote server computer 106. The remote server computer 106 may be in operative communication with the response router 108. The first, second, and third data capture computers 110A, 1106, and 110C can be in operative communication with the data store 104.

In some embodiments, the processing computer 102 and the remote server computer 106 may communicate with each other so as to access information required to decrypt and/or verify data (e.g., server private keys, shared secrets, key derivation parameters, cryptogram derivation parameters, update parameters, cryptograms, request data, etc.).

The devices in system 100 may be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP), Hyper-Text Transfer Protocol (HTTP), Secure Hypertext Transfer Protocol (HTTPS), Secure Socket Layer (SSL), ISO (e.g., ISO 8583) and/or the like.

For simplicity of illustration, a certain number of components are shown in FIG. 1. It is understood, however, that embodiments of the invention may include more than one of each component. For example, the system 100 can include two, three, or more remote server computers. The system 100 can also include any suitable number of data capture computers (e.g., 1, 10, 1000, etc.)

The processing computer 102 may be a server computer and can be configured to retrieve data from the data store 104. The processing computer 102 can retrieve data (e.g., a plurality of network data) from the data store 104 in any suitable manner. For example, a query language (e.g., structured query language (SQL)) can be used to prepare data queries, to query data from the data store 104. The data store 104 may store network data (e.g., fraud network data, purchase network data, returns network data, etc.). The data store 104 may be a conventional, fault tolerant, relational, scalable, secure database such as those commercially available from Oracle™ or Sybase™.

The processing computer 102 can be configured to process retrieved network data to determine latent values. The processing computer 102 can be configured to query the data store 104 for a plurality of network data since a last epoch of data. The processing computer 102 can be configured to then generate adjacency matrices based on the plurality of network data. The processing computer 102 can be configured to perform tensor factorization on the adjacency matrices to obtain latent values in the network data. The processing computer 102 can also be configured to determine that the latent values satisfy a predetermined criterion. For example, the processing computer 102 can determine whether or not the latent values are statistically relevant. The processing computer 102 can also be configured to determine a relevant model and input the latent values into a model, where the model generates output data. The processing computer 102 can also be configured to generate an alert comprising the output data and transmit the alert to a remote server computer.

The remote server computer 106 may be a server computer and may be operated by an entity (e.g., a bank). The remote server computer 106 can be configured to generate and transmit an event request message to the processing computer 102. The remote server computer 106 can select a model of a plurality of models for the processing computer 102 to run in relation to an event provided by the remote server computer 106 in the event request message.

For example, the remote server computer 106 can be configured to generate an event request message comprising event data related to a user and transmit the event request message to the processing computer 102. After the processing computer 102 runs the relevant model, the remote server computer 106 can further be configured to receive an event response message and then perform additional processing, as described herein, based upon the event response message.

The response router 108 may be capable of routing responses between the processing computer 102 and the remote server computer 106. The response router 108 may store any suitable routing tables. The routing tables may include, for example, network identifiers, network destinations, netmasks, gateways/next hops, interfaces, metrics, etc.

The plurality of capture computers 110A, 1106, and 110C can be configured to obtain network data. The data capture computers can obtain network data by measuring network data and/or determining network data. The data capture computers can be configured to store the network data in the data store 104. For example, the first data capture computer 110A can store transaction data in the data store 104. The transaction data can include any suitable information (e.g., amounts, entities involved, stock keeping unit (SKU) data, location, time, etc.). The capture computers can include any suitable device, for example, the capture computers can be server computers. For example, a data capture computer can acquire data from interactions. In some embodiments, the data capture computers can capture temperatures, data rates, network traffic, event frequencies, user input, resource provider data, and/or other suitable data.

B. Processing Computer

Figure 2:
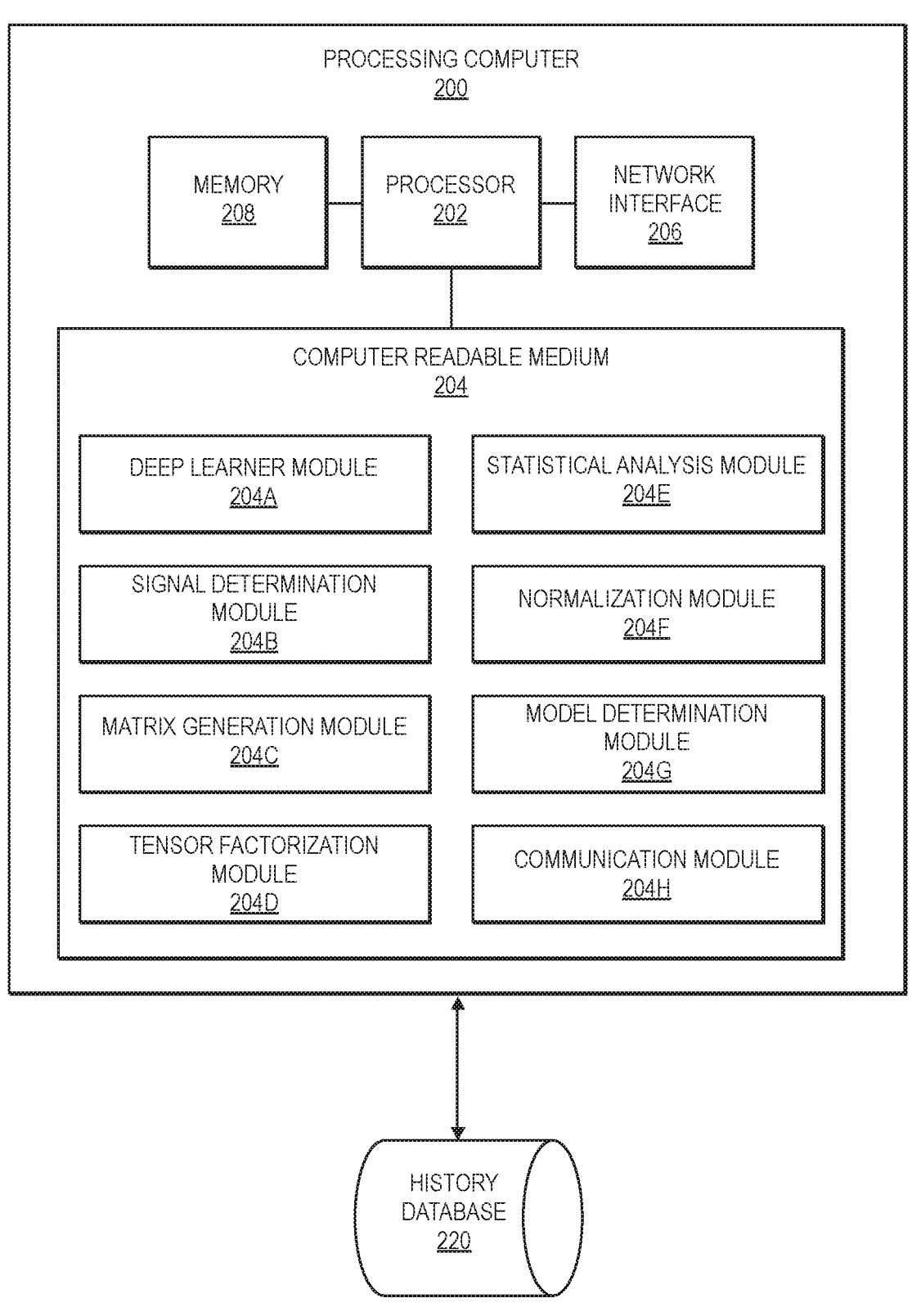
FIG. 2 shows a block diagram of a processing computer according to embodiments of the invention.

FIG. 2 shows a block diagram of a processing computer according to embodiments. The processing computer 200 may comprise a processor 202, a computer readable medium 204, a network interface 206, and a memory 208. The computer readable medium 204 can comprise a deep learner module 204A, a signal determination module 204B, a matrix generation module 204C, a tensor factorization module 204D, a statistical analysis module 204E, a normalization module 204F, a model determination module 204G, and a communication module 204H. The processing computer 200 can also be operatively coupled to a history database 220.

The computer readable medium 204 may comprise code, executable by the processor 202. The computer readable medium 204 may contain any number of applications, modules, and code. The computer readable medium 204 can comprise code executable by the processor for implementing a method comprising: querying, by a processing computer, a data store for a plurality of network data since a last epoch of data; generating, by the processing computer, matrices based on the plurality of network data; performing, by the processing computer, tensor factorization on the matrices to obtain latent values in the plurality of network data; determining, by the processing computer, that the latent values satisfy a predetermined criterion; inputting, by the processing computer, the latent values into a model, wherein the model generates output data; generating, by the processing computer, an alert comprising the output data; and transmitting, by the processing computer, the alert to a remote server computer.

The deep learner module 204A, in conjunction with the processor 202, can train a model with training data (e.g., a plurality of network data). The deep learner can include any suitable deep learner (e.g., deep neural networks (DNNs), recurrent neural networks (RNNs), convolutional deep neural networks (CNNs), etc.). In some embodiments, the deep learner module 204A, in conjunction with the processor 202, can overfit the plurality of network data to determine output data. It can be beneficial to overfit the plurality of network data as to later determine stronger signals that can be detected by the signal determination module 204B. In some embodiments, the deep learner module 204A can include one or more deep learners.

For example, the deep learner module 204A, in conjunction with the processor 202, can receive, as input, the plurality of network data retrieved from the data store 104. The deep learner module 204A, in conjunction with the processor 202, can train an overfitted model on the plurality of network data. For example, a very large number of hidden nodes in a deep neural network can cause the model to be overfit. For example if there were 2000 hidden nodes, each hidden node might simply learn which of 2000 examples (of the input data) were seen and map them to outputs with no generalization. However with only 200 hidden nodes, the neural network can be tuned to find some commonalities between subsequent epochs of network data.

As an example, the plurality of network data can relate to transaction data, fraud data, resource provider data, etc. In some embodiments, the deep learner module 204A, in conjunction with the processor 202, can determine community groups from the network data, as known to one of skill in the art. The deep learner module 204A, in conjunction with the processor 202, can determine output data, which can include the determined community groups. For further details on community group determination see [Fortunato, Santo. "Community detection in graphs." *Physics reports* 486.3-5 (2010): 75-174.] which is incorporated herein for all purposes.

The signal determination module 204B, in conjunction with the processor 202, can determine if a signal is present in the plurality of network data. The signal can indicate whether or not the processing computer 200 can further process the plurality of network data to determine latent values. The signal can identify any suitable trend indicating a change in the plurality of network data. The signal determination module 204B, in conjunction with the processor 202, can compare output data to previously determined output data. The deep learner module 204A, in conjunction with the processor 202, can determine first output data during a first epoch, which may be stored in a database between epochs, as well as determine second output data during a second epoch. The signal determination module 204B can compare the first output data to the second output data.

Since the data of each epoch is overfit with the deep learner, drastic changes in the output of the deep learner between epochs can be made readily apparent. As an illustrative example, an overfit decision boundary may weave tightly between two types of labeled data, whereas a not overfit decision boundary may not be as variant as the overfit decision boundary and may give a better prediction for future unlabeled data. However, when comparing the overfit decision boundary between two epochs, the difference will be greater than the difference when comparing two not overfit decision boundaries. This is beneficial when the signal determination module 204B, in conjunction with the processor 204, determines whether or not a signal is present. The greater amount of difference between the decision boundary between the two epochs will lead to a higher chance of determining if a signal is present. Even though decision boundaries are discussed, it is understood that any suitable output data can be determined from an overfitting deep learner.

As another example, the first output data and the second output data can both include a plurality of community groups. The signal determination module 204B, in conjunction with the processor 202, can compare the number of community groups, the size of the community groups, the location of the community groups in variable space, and/or any other characteristics included in the output data.

In some embodiments, the signal determination module 204B, in conjunction with the processor 202, can determine a type associated with the signal. For example, the signal determination module 204B, in conjunction with the processor 202, can determine the type to be "fraud," "weather," etc. For example, if a community group associated with check fraud changes between epochs (e.g., the community group substantially increases in size), then the signal determination module 204B, in conjunction with the processor 202, can determine the signal to be "fraud" or "check fraud."

The matrix generation module 204C, in conjunction with the processor 202, can generate any suitable matrices based on the plurality of network data. For example, the matrix generation module 204C, in conjunction with the processor 202, can generate an adjacency matrix, degree matrix, etc. As an example, an adjacency matrix and a degree matrix are shown in FIG. 10, and described in further detail below.

In some embodiments, the matrix generation module 204C, in conjunction with the processor 202, can generate the adjacency matrix using network data associated with the signal determined by the signal determination module 204B. For example, if the signal determination module 204B, in conjunction with the processor 202, determines an increase in size of a community group representing check fraud, then the matrix generation module 204C, in conjunction with the processor 202, can generate an adjacency matrix from the fraud network data, rather than from the full multiplex graph comprising the plurality of network data.

The tensor factorization module 204D, in conjunction with the processor 202, can perform tensor factorization on the adjacency matrix to determine latent values. In some embodiments, the tensor factorization module 204D, in conjunction with the processor 202, can perform tensor factorization using the Tucker model. The Tucker model may decompose a tensor into a set of matrices and one small core tensor. In some embodiments, tensor factorization can also be referred to as tensor decomposition. Further details of the Tucker model can be found in section 4 of [Kolda, Tamara G., and Brett W. Bader. "Tensor decompositions and applications." *SIAM review* 51.3 (2009): 455-500.], which is herein incorporated in its entirety for all purposes. For further details on tensor factorization as well as its application to latent variables can be found in, for example, [Rabanser, Stephen, et al. "Introduction to Tensor Decompositions and their Applications in Machine Learning" in ArXiv (2017)], which is herein incorporated by reference in its entirety for all purposes. Further, examples of probabilistic latent tensor factorization for audio modeling can be found in, for example, [Cemgil, Ali Taylan, et al. "Probabilistic latent tensor factorization framework for audio modeling." 2011 *IEEE Workshop on Applications of Signal Processing to Audio and Acoustics* (*WASPAA*). IEEE, 2011.], which is herein incorporated by reference in its entirety for all purposes. Tensor factorization is also described in PCT Application No. PCT/US2019/030443, filed on the same day as the present application, and entitled "System and Method Including Accurate Scoring and Response". This application is assigned to the same assignee as the present application and is herein incorporated by reference in its entirety.

For instance, tensor factorization can be used to model three-way (or higher way) data by means of relatively small numbers of components for each of the three or more modes, and the components can be linked to each other by a three- (or higher-) way core array. The model parameters are estimated in such a way that, given fixed numbers of components, the modelled data optimally resembles the actual data in the least squares sense. The model can give a summary of the information in the data, in the same way as principal components analysis does for two-way data.

The processing computer 200 can factorize a tensor into a core tensor multiplied (or otherwise transformed) by a matrix along each mode. For example, as described in further detail in [Kolda, Tamara G., and Brett W. Bader. "Tensor decompositions and applications." *SIAM review* 51.3 (2009): 455-500.], the three-way situation can be written as:

$$X \approx \sum_{p=1}^{P}\sum_{q=1}^{Q}\sum_{r=1}^{R} g_{pqr} a_p \circ b_q \circ c_r$$

where g, a, b, and c correspond to a core tensor, a first factor matrix, a second factor matrix, and a third factor matrix, respectively. P, Q, and R, and respectively p, q, and r, represent the three dimensions of the tensor X. The symbol ○ represents the vector outer product. These factor matrices can be considered the components in each mode of the core tensor corresponding to g. The core tensor can include entries which show the level of interaction between the different components. The combination of the factor matrices and the core tensor can be equal to the original tensor X.

The statistical analysis module 204E, in conjunction with the processor 202, can determine whether or not the latent values, determined by the tensor factorization module 204D, are statistically relevant. The statistical analysis module 204E, in conjunction with the processor 202, can perform any suitable statistical analysis on the latent values. In some embodiments, the statistical analysis module 204E, in conjunction with the processor 202, can compare the determined latent values to known historic values stored in a database to determine if the latent values are statistically relevant. For example, the statistical analysis module 204E, in conjunction with the processor 202, can determine that the determined latent values are 12% higher than the average historic values retrieved from the database, leading the statistical analysis module 204E, in conjunction with the processor 202, to determine that the determined latent values are statistically relevant. As another example, the statistical analysis module 204E, in conjunction with the processor 202, can compare 100 determined latent values ranging from 0.01 to 0.05 gallons relating to the latent variable of water usage, to historic values ranging from 10 to 50 gallons. The statistical analysis module 204E, in conjunction with the process 202, can determine that the latent values are not statistically relevant since they are approximately 1000 times smaller than the historical values.

In other embodiments, the statistical analysis module 204E, in conjunction with the processor 202, can compare the determined latent values to one another. For example, the determined latent values may include 5 values relating to the latent variable of water usage. The latent values may be 1, 3, 0.5, 6, and 50 gallons. The statistical analysis module 204E, in conjunction with the processor 202, can determine that one of the latent values (e.g., 50 gallons), is greater than 8 times larger than the other latent values, and determine that the latent value of 50 gallons is statistically relevant, but the latent values of 1, 3, 0.5, and 6 gallons are not statistically relevant.

For example, in some embodiments, the statistical analysis module 204E, in conjunction with the processor 202, can determine a Cramér-Rao bound (CRB) which expresses a lower bound on the variance of unbiased estimators of a deterministic (i.e., fixed, though unknown) parameter to determine whether or not the latent values are statistically relevant. In some cases the CRB can also be used to bound the variance of biased estimators of given bias. Estimators that are close to the CRB are more unbiased (i.e. more preferable to use) than estimators further away.

For example, the statistical analysis module 204E, in conjunction with the processor 202, can use Fisher information which can include data which describes how much information about an unknown parameter can be obtained from a sample, as known to one of skill in the art. For example, let $X_1$, $X_2$, . . . $X_n$ be a random sample with probability density function (pdf) $f(x, \Theta)$. If $\hat{\Theta}$ is an unbiased estimator for the mean $\Theta$, then, $$var(\hat{\Theta}) \geq 1/n * I(\Theta)$$

where the Fisher information is:

$$I(\Theta) = -E\left[\frac{\partial^2}{\partial x^2}\ln(f(X;\Theta))\right]$$

The normalization module 204F, in conjunction with the processor 202, can normalize the latent values to latent values to other historic values. In some embodiments, the latent values may be normalized if a model, into which they will be inputted to, accepts normalized values as input. The normalization module 204F, in conjunction with the processor 202, can normalize the latent values in any suitable manner. In some embodiments, the normalization module 204F, in conjunction with the processor 202 can normalize the latent values min-max scaling. For example, the normalization module 204F, in conjunction with the processor 202, can subtract the minimum value and divide by the range of each latent value. In other embodiments, the normalization module 204F, in conjunction with the processor 202, can normalize the latent values by performing standardization scaling, for example, by subtracting each latent value by the mean and dividing by the standard deviation.

In yet other embodiments, for example, the normalization module 204F, in conjunction with the processor 202, can normalize the latent values using an autoregressive integrated moving average (ARIMA) model. The normalization module 204F, in conjunction with the processor 202, can comprise computing an ARIMA model as known to one of skill in the art.

In some embodiments, the network data may be autoregressive. Autoregressive data may include variables that depend on their own previous values. For example, a user may perform repeat transactions with a resource provider due to a number of factors including ads, availability, convenience, preferences, and/or propensities. The ARIMA model can take autoregressive data into account comprises three major aspects including autogregression (AR), integrated (I), and moving average (MA). The AR aspect can be a model that uses the dependent relationship between an observation and some number of lagged observations. The integrated aspect can be the use of differencing of raw observations (e.g., subtracting an observation from an observation at the previous time step) in order to make the time series stationary. The MA aspect can include a model that uses the dependency between an observation and a residual error from a moving average model applied to lagged observations.

Each of these components can be specified in the model as a parameter. A standard notation is used of ARIMA(p, d, q) where the parameters are substituted with integer values to quickly indicate the specific ARIMA model being used. The parameters of the ARIMA model can include:

| | |
|---|---|
| p | The number of lag observations included in the model, also called the lag order |
| d | The number of times that the raw observations are differenced, also called the degree of differencing |
| q | The size of the moving average window, also called the order of moving average |

The model determination module 204G, in conjunction with the processor 202, can determine a model to run, where the model is associated with the latent values and/or the type of the signal (e.g., fraud, weather, water usage, etc.). The model determination module 204G, in conjunction with the processor 202, can search through a plurality of models stored in a database. The plurality of models can include any suitable models, for example, the plurality of models can include artificial neural networks, support vector machines, Bayesian networks, genetic algorithms, and/or any other suitable models previously trained by a server computer and/or the processing computer 102. In some embodiments, the model determination module 204G, in conjunction with the processor 202, can determine one or more models.

For example, the model determination module 204G, in conjunction with the processor 202, can receive latent values associated with the latent variable of fraud. The latent values can be associated with fraud in any suitable manner (e.g., via a tag of "fraud," a signal indicating fraud, etc.). The model determination module 204G, in conjunction with the processor 202, can then query the history database 220, as described herein, for models related to the tag of "fraud." In some embodiments, the latent values can be associated with a more specific type (e.g., check fraud, identify fraud, credit fraud, etc.), where the model determination module 204G, in conjunction with the processor 202, can query the history database 220 for the more specific type.

Upon determining the model, the processing computer 200 can input the latent values into the model. The model can generate output data based on the latent values. The output data can include any suitable data output by a machine learning (ML) model. The output data can be a single value if the ML model is a regression model, n classes and a probability that the input is of a class if the ML model is a classification model, a string including a word, a character, a sentence, etc. if the ML model is a text summarization model, etc. For example, if the latent values are associated with the latent variable of check fraud, then the output data may include a probability that a particular location (e.g., zip code, city, etc.) will have similar check fraud. The output data can then be used to notify remote server computers of the high probability of check fraud.

The communication module 204H, in conjunction with the processor 202, can be configured to transmit and receive data and information for communicating with other modules or entities. For example, the communication module 204H, in conjunction with the processor 202, may transmit to and receive messages from the remote server computer. In some embodiments the messages received from external entities may have been encoded and encrypted for secure communication. The communication module 204H, in conjunction with the processor 202, may decode and decrypt the message to determine whether the message is for a processing event request message or any such message transmitted from the remote server computer. In some embodiments, the communication module 204H, in conjunction with the processor 202, may also be configured to format, encode and encrypt the messages transmitted to other entities, such as, the remote server computer.

The network interface 206 may include an interface that can allow the processing computer 200 to communicate with external computers. The network interface 206 may enable the processing computer 200 to communicate data to and from another device (e.g., resource provider computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The memory 208 may store data securely. The secure memory can store cryptographic keys, network data, routing tables, and/or any other suitable information used in conjunction with the modules.

After determining whether the latent values are statistically relevant (e.g., using the statistical analysis module 204E), the processing computer 200 can store the latent values in the history database 220. The latent values can be stored with a timestamp and/or other information identifying the epoch in which the latent values were determined. In some embodiments, the signal may also be stored in the history database 220.

The history database 220 can include any suitable database. The history database 220 can store latent values and/or models. In some embodiments, a server computer (not shown) can train the models with the latent values as the processing computer 200 determines new latent values. In this way, the models can evolve over time as the processing computer 200 processes network data and determines latent values.

C. Remote Server Computer

Figure 3:
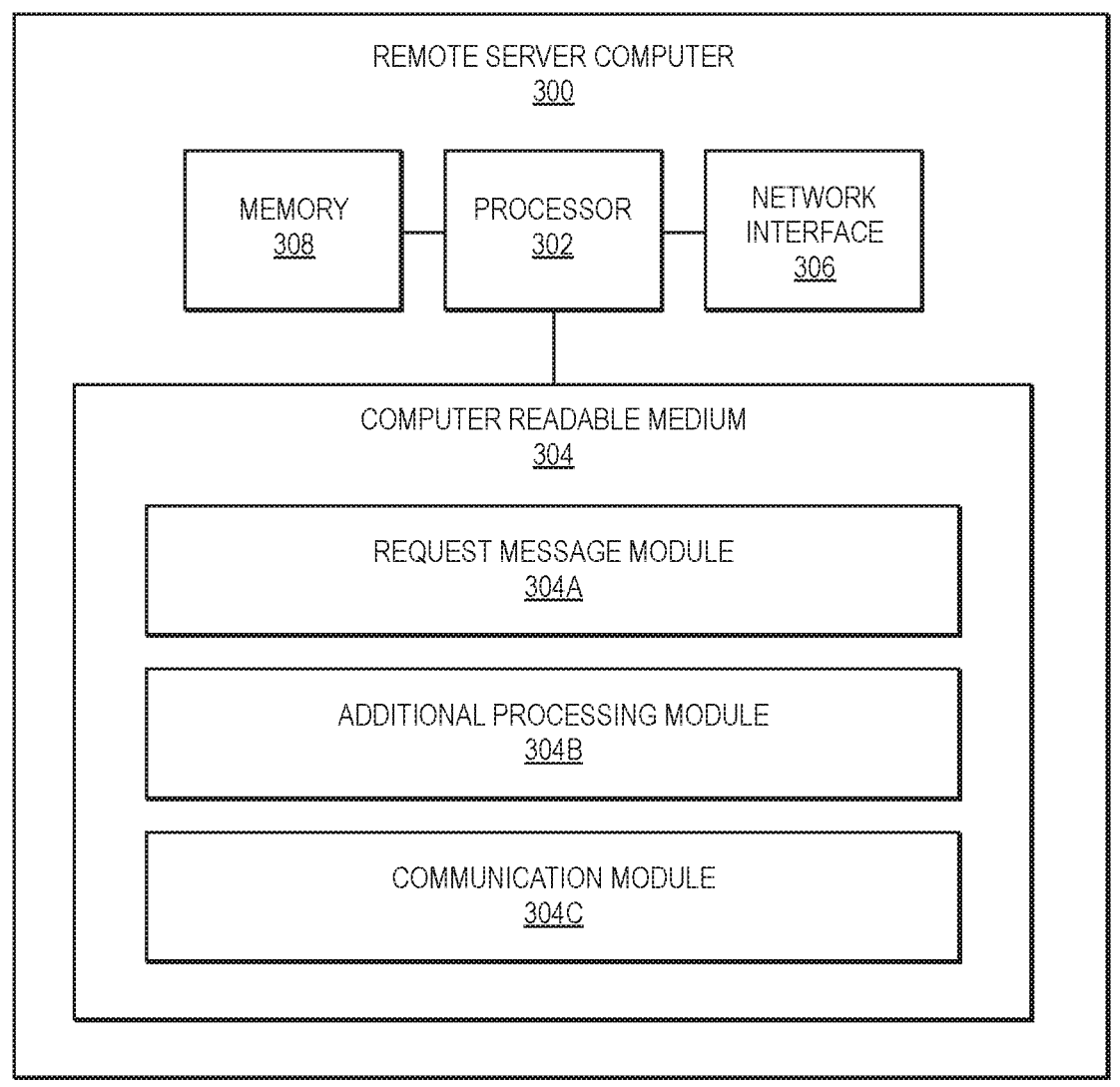
FIG. 3 shows a block diagram of a remote server computer according to embodiments of the invention.

FIG. 3 shows a block diagram of a remote server computer according to embodiments. The remote server computer 300 may comprise a processor 302, a computer readable medium 304, a network interface 306, and a memory 308. The computer readable medium 304 can comprise an event request message module 304A, an additional processing module 304B, and a communication module 304C.

The computer readable medium 304 may comprise code, executable by the processor 302. The computer readable medium 304 may contain any number of applications, modules, and code. The computer readable medium 304 can comprise code executable by the processor for implementing a method comprising: generating, by a remote server computer, an event request message comprising event data related to a user; transmitting, by the remote server computer, the event request message to a processing computer, wherein the processing computer determines a model associated with the event data, runs the model on the event data to determine output data, and transmits an event response message comprising the output data to the remote server computer; receiving, by the remote server computer, the event response message; and performing, by the remote server computer, additional processing based upon the event response message.

The event request message module 304A, in conjunction with the processor 302, can generate event request messages comprising event data. In some embodiments, the event request message module 304A, in conjunction with the processor 302, can generate the event request messages comprising destination IP address(es), origin IP address(es), cryptographic keys, etc.

The additional processing module 304B, in conjunction with the processor 302, can perform any suitable additional processing based on and/or with the output data received from the processing computer. For example, additional processing can include notifying users of fraud, opportunities, goods, services, events, and/or the like, updating suitable index tables, performing fraud prevention measures, measure additional network data regarding a particular type of data, and/or any other processing based on the received output data.

The communication module 304C, in conjunction with the processor 302, can be similar to the communication module 204H and will not be repeated here. The network interface 306 may be similar to the network interface 206 and will not be repeated here. The memory 308 can be similar to the memory 208. The memory 308 can store cryptographic keys, routing tables, and/or any other suitable information used in conjunction with the modules.

II. Methods

Embodiments can use the systems and apparatuses described above to process network data and determine latent values. FIGS. 4-10 describe some examples of such methods. In some embodiments, the processing computer may include the processing computer 102 or 200 of FIGS. 1 and 2, respectively. The remote server computer may include the remote server computer 106 or 300 of FIGS. 1 and 3, respectively.

Embodiments of the invention can utilize graph analysis, deep learning, and statistical techniques to determine latent values in a plurality of network data. In embodiments, the relationship between users and resource providers can be expressed in a multiplex graph using different connection relationships (e.g., purchase, returns, fraud, etc.).

In some embodiments, a processing computer can analyze a multiplex graph comprising a plurality of network data. The processing computer can utilize one or more deep learners to determine signal(s) in the network data. The network computer can then generate relevant matrices (e.g., an adjacency matrix) as well as perform tensor factorization to determine latent values. The processing computer can then determine whether or not the latent values are statistically relevant. The processing computer can also normalize the latent values using suitable normalization methods (e.g., ARIMA, etc.). The processing computer can determine whether or not the latent values satisfy a predetermined criterion. The processing computer can then determine and run a model relevant to the latent values. The processing computer can also generate and transmit an alert to a remote server computer.

A. Overview

Figure 4:
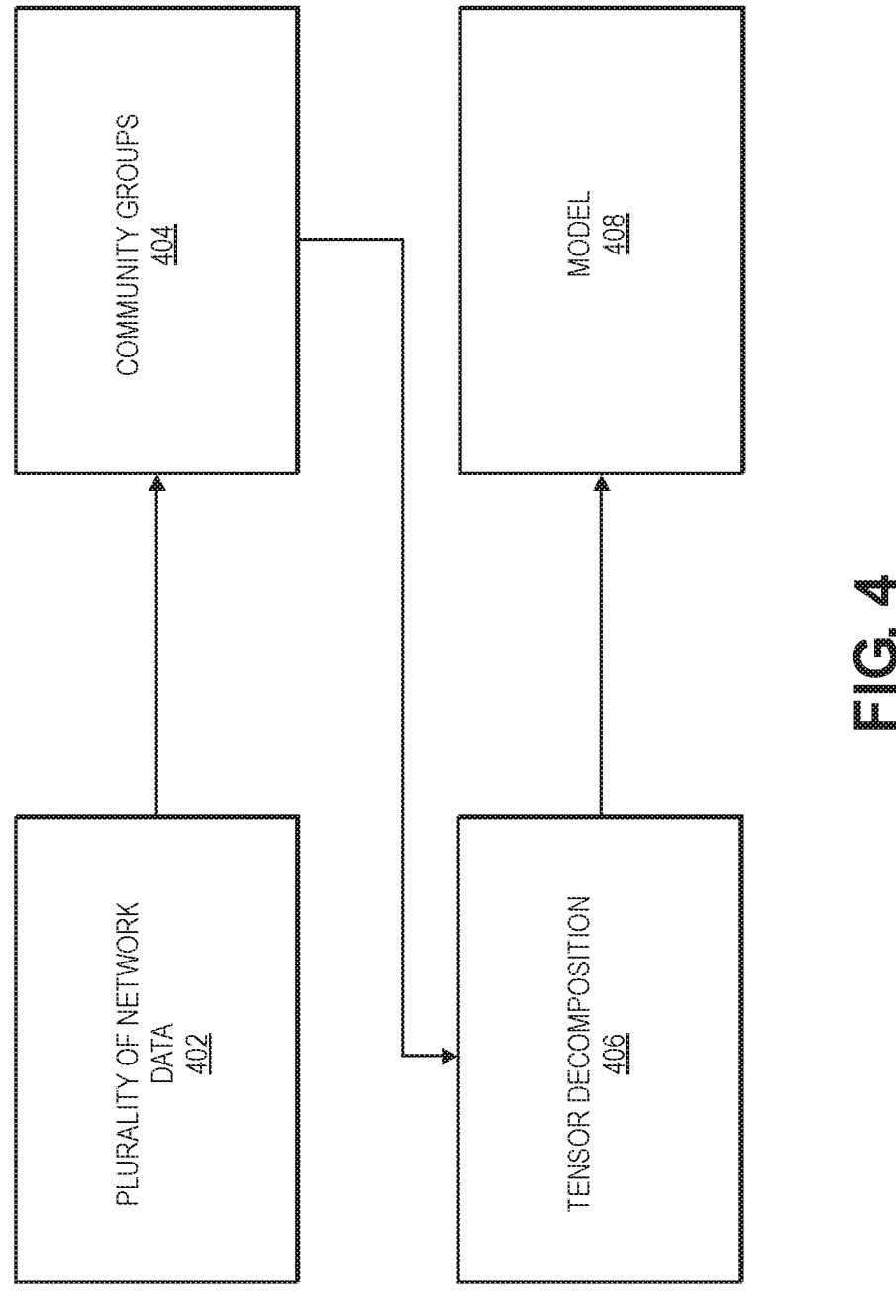
FIG. 4 shows an overview of a latent value detection method according to embodiments.

A system, as described above, can process data and determine latent values associated with latent variables. FIG. 4 shows an overview of a latent value detection method according to embodiments. The method illustrated in FIG. 4 will be described in the context of a system determining latent values from a plurality of network data. It is understood, however, that the invention can be applied to other circumstances.

The method illustrated in FIG. 4 can include several steps of processing. The first step can include the processing computer pre-processing the plurality of network data 402. The processing computer can then perform community detection to determine community groups 404 and, subsequently, perform detection of latent values via tensor decomposition 406. The processing computer can then input the latent values into a model 408. Further details of the steps illustrated in FIG. 4 are described in FIG. 7 below. FIG. 4 is meant to give an overview of the process performed by the processing computer.

The plurality of network data 402 may include a multiplex graph comprising a plurality of network data and may be stored at the data store 104. The plurality of network data 402, for example, may be fraud network data, crime network data, transaction network data, weather network data, etc. The plurality of network data 402 can be used to uncover latent values which can yield insights about the users, locations, resource providers, and even situational data such as weather. Using graph analysis, deep learning, and statistical techniques, the processing computer can uncover these latent values that provide insights into the driving factors for users and resource providers. These latent values can be used to create and/or further train models.

The processing computer can pre-process the plurality of network data 402 in any suitable way. For example, the processing computer can normalize plurality of network the data 402. The processing computer can perform cleaning (e.g., removing typographical errors, etc.), instance selection, transformation, feature extraction, feature selection, and/or the like.

The processing computer can then perform community detection to determine the community groups 404 after the plurality of network data 402 is retrieved from the data store 104 and/or pre-processed by the processing computer. Community detection can include detecting or determining community groups 404 in the plurality of network data 402. The processing computer can determine the communities in any suitable manner. For example, the processing computer can perform graph partitioning, hierarchical clustering, spectral clustering, multiresolution methods, etc. For further detail, see [Fortunato, Santo. "Community detection in graphs." *Physics reports* 486.3-5 (2010): 75-174.], which is incorporated herein by reference for all purposes. In other embodiments, the processing computer can input the plurality of network data 402 into any suitable deep learner to determine output data, as described in further detail herein.

Further details regarding machine learning and prediction using graph communities can be found in PCT patent application international publication number WO 2018/013566 A1, filed Jul. 11, 2017, by Harris, et al., which is incorporated herein by reference for all purposes.

The community groups 404 can be clusters of nodes grouped together due to the nodes sharing common characteristics. For example, the processing computer can determine community groups 404 from the fraud network data. The community groups 404 can include 3 community groups. The nodes in a community group may be related in any suitable manner, for example, a first community group may include nodes indicating online transactions associated with credit card fraud, a second community group may include nodes indicating transactions associated with a particular geographic area, and a third community group may include nodes associated with compromised primary account numbers (PANs) with the same first four digits.

The processing computer can then perform detection of latent values via tensor decomposition 406, which may be a process of determining latent values in the plurality of network data 402. The processing computer 102 can use community structures generated by a graph learner (e.g., K-core, iterative principal component analysis (IPCA), etc.) to determine output data, and can then perform tensor decomposition 406 on adjacency matrices determined based on the output data. Tensor decomposition 406 is described in further detail herein.

The processing computer 102 can then use these uncovered latent values to drive a model built using network data and external data for events (e.g., local sporting outcomes, fatal accident reports, etc.). These models can be used to quantify risk, assess propensities, and provide segments for events such as user site navigation on a web site. These models can also be run in batch mode for targeted populations to issue alerts based on activity.

The processing computer can input the latent values into the model 408. The model 408 can generate output data which may be transmitted to remote server computers in alert messages. The details of the process are described in further detail below.

B. Multiplex Graphs

Network data can include any suitable type of data. For example, network data can include purchase network data, fraud network data, returns network data, weather network data, water usage network data, temperature reading network data, etc. A multiplex network can be an example of a plurality of network data. For example, a multiplex network can comprise purchase network data, fraud network data, and returns network data.

Figure 5:
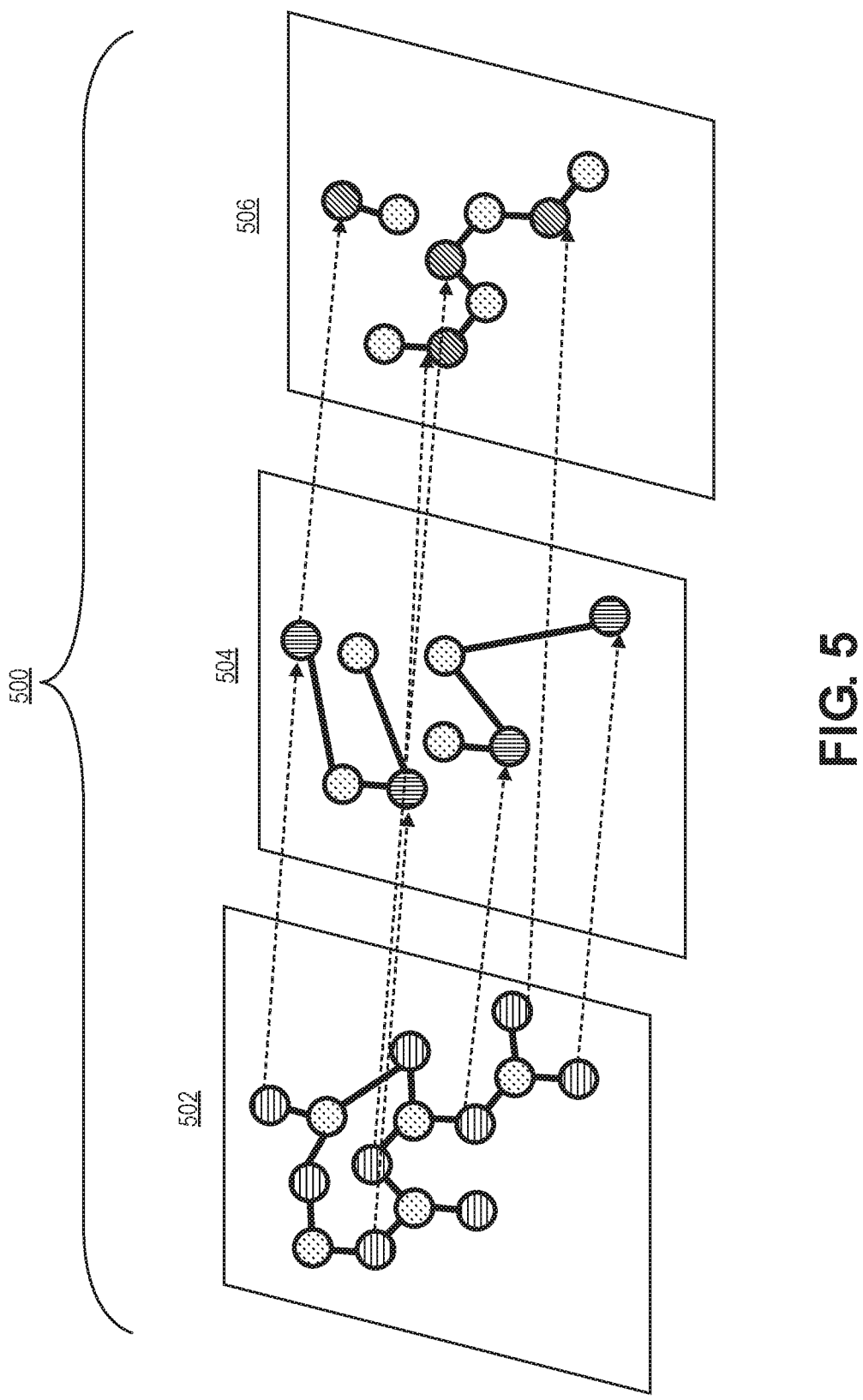
FIG. 5 shows an example multiplex network according to embodiments.

FIG. 5 shows a multiplex graph 500 according to embodiments. The multiplex graph 500 can comprise first network data 502, second network data 504, and third network data 506. However, it is understood that the multiplex graph 500 can comprise any suitable amount of network data. In some embodiments, the multiplex graph 500 can be expressed as a tensor. The true relationship between users and resource providers can be a hyper graph, but can be expressed as a bipartite graph for ease of illustration. However, a simple bipartite graph removes too much information, such as, information regarding if two users connected via a first resource provider or second resource provider. To solve this, the relationship can be expressed as the multiplex graph 500.

For example, the nodes of the first network data 502 may include nodes that represent purchases. The nodes (i.e., purchases) may be connected via edges. An edge that connects two purchases may represent a relationship between the two purchases. For example, two nodes connected by an edge in the first network data 502 may be purchases performed by the same user.

The nodes of the second network data 504 may include nodes that represent fraud. The nodes (i.e., fraudulent purchase, identify theft, etc.) may be connected via edges. An edge that connects two fraud nodes may represent a relationship between the two instances of fraud. For example, two nodes connected by an edge in the second network data 504 may both be fraudulent activities performed in a geographic location (e.g., in a mall), at a same type of resource provider, a same type of payment, and/or any other similar characteristic between the nodes. In the multiplex graph 500, nodes in the first network data 502 can relate to nodes in the second network data 504. For example, a purchase node in the first network data 502 can relate (e.g., via an edge) to a node representing fraud in the second network data 504. For example, the purchase may be a fraudulent purchase.

The nodes of the third network data 506 may include nodes that represent returns. The nodes (i.e., returns of a product purchased in a previous transaction) may be connected via edges. An edge that connects two return nodes may represent a relationship between the two returns. For example, two nodes connected by an edge in the third network data 506 may both be returns involving high worth goods (e.g., televisions). In the multiplex graph 500, nodes in the first network data 502 and/or the second network data 504. For example, a purchase node in the first network data 502 related to a fraud node in the second network data 504 can be related to a node representing a return in the third network data 506. For example, the purchase may be a fraudulent purchase and the purchased product may have been returned to the resource provider.

Figure 6:
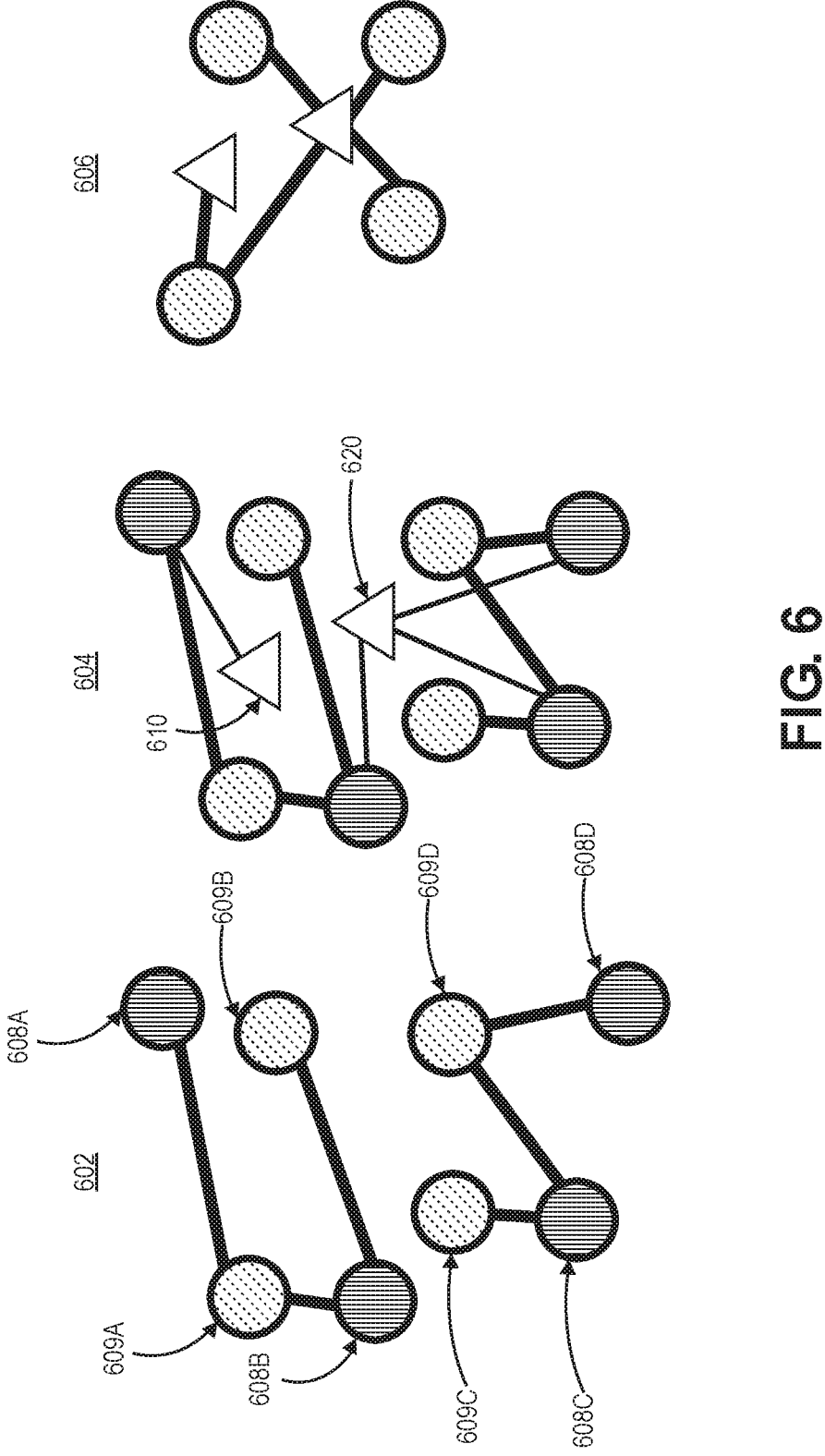
FIG. 6 shows a network with a latent vertex according to embodiments.

FIG. 6 shows a network with a latent vertex according to embodiments. FIG. 6 includes network data 602, network data with latent values 604, and a latent value network 606. The graphs shown in FIG. 6 comprise a number of nodes and edges.

The network data 602 may include network data associated with fraudulent transactions. For example, the network data 602 may be stored in the data store 104 and may have been captured by one or more data capture computers.

The dotted nodes in the network data 602 can indicate resource providers and the striped nodes in the network data 602 can indicate users (i.e., cardholders). The edges connecting a resource provider node to a user node can indicate an instance of fraud. For example, a user node and a resource provider node can be connected by an edge in the network data 602 if fraud was reported for a transaction that occurred between the user and the resource provider. Data associated with the fraudulent transaction can include any suitable data, for example, a date and time, an amount, and/or other transaction details. The user node can include data indicating the user (e.g., a name, a PAN, etc.). The resource provider node can include data indicating the resource provider (e.g., resource provider ID, name, etc.). Additionally, the network data 602 is an example of a bipartite graph, as resource provider nodes are not connected to resource provider nodes, and user nodes are not connected to user nodes.

As an illustrative example, the network data 602 can include four resource providers including a resource provider A 609A, a resource provider B 609B, a resource provider C 609C, and a resource provider D 609D. The network data 602 can also include four users including a user A 608A, a user B 608B, a user C 608C, and a user D 608D. The resource provider A 609A can include a resource provider identifier (e.g., "12345," "RPA," etc.). Each resource provider can be associated with a unique resource provider identifier. The user A 608A can include a user identifier (e.g., a PAN, a name, etc.). The resource provider A 609A can be connected to the user A 608A by a fraudulent transaction. For example, the credit card information of user A 608A may have been compromised by a fraudster. The fraudster may perform an online transaction with the resource provider A 609A. The resource provider A 609A and the user A 608A can be further associated with additional information regarding the fraudulent transaction. For example, the fraudster may have performed the fraudulent online transaction at 8:30 PM for an amount of $250.

The network data with latent values 604 represents the network data 602 as well as additional nodes (i.e., latent values) representing, for example, fraudsters. For example, a fraudster may have used a stolen credit card to perform a transaction with a resource provider. In some embodiments, the latent values may be initially unknown by the processing computer 102, but determined using methods as described herein. The fraudster nodes can include the node 610 and the node 620. In other embodiments, the network data with latent values 604 may indicate unknown nodes and edges. The network data with latent values 604 may differ at a given point in time from the network data 602. The processing computer 102 may look at network data 602 across time by constructing fraud networks based on intertemporal connections with inferred common actors or scripts. The processing computer 102 can then estimate latent values to proxy the fraudsters (e.g., node 610 and node 620) and rebuild the network.

The network data with latent values 604 can include the estimated fraudsters as nodes 610 and 620. The nodes 610 and 620 can be connected to user nodes via edges. For example, the node 610 can be a fraudster that is estimated to have committed the fraud associated with one user, and thus is represented in the graph by connecting to one user node via an edge. The edge can represent a connection between the user and the fraudster. The node 620 can be a fraudster that is estimated to have committed the fraud associated with three users, and thus is represented in the graph by connecting to three user nodes via three edges.

The network data with latent values 604 can include the same resource provider and user nodes as the network data 602. For example, the network data 602 can include the resource provider A 609A, the resource provider B 609B, the resource provider C 609C, the resource provider D 609D, the user A 608A, the user B 608B, the user C 608C, and the user D 608D. The estimated fraudsters (determined as described herein using at least tensor factorization) including the first estimated fraudster 610 and the second estimated fraudster 620 can be associated via edges with the users which they defrauded (e.g., stole credit cards from, etc.). For example, the first estimated fraudster 610 may be determined to be associated with the user A 608A, because the first estimated fraudster 610 performed a fraudulent online transaction with the credit card of user A 608 from an IP address of 123.45.678.9. The second estimated fraudster 620 may be determined to be associated with the user B 608B, the user C 608C, and the user D 608D, because the second estimated fraudster 620 performed three fraudulent online transactions with the credit cards of the user B 608B, the user C 608C, and the user D 608D all from the IP address of 987.65.432.1.

The second estimated fraudster 620 can be associated with a common set of rules for performing fraud. For example, the second estimated fraudster 620 may perform multiple fraudulent online transactions from the same point of origin (e.g., IP address 987.65.432.1). Whereas, the first estimated fraudster 610 may only be associated with the user A 608A since the first estimated fraudster 610 performed a fraudulent online transaction from a different point of origin (e.g., IP address 123.45.678.9), and is thus determined to be a different fraudster by the processor computer 102.

The latent value network 606 may be a network of latent values determined by the processing computer 102 connected to the appropriate fraud nodes from the network data 602. In some embodiments, the latent value network 606 may be a network which numerically portrays the true fraudsters. For example, the latent value network 606 includes edges that connect the estimated fraudsters to the resource provider nodes. The latent value network 606 more accurately portrays the relationship of the fraudsters performing fraudulent transactions with the resource providers, over the network data 602 which shows the users connected to resource providers with fraudulent transactions.

For example, the first estimated fraudster 610 can be directly linked (via an edge) to the resource provider which they performed the fraudulent online transaction with. The first estimated fraudster 610 can be connected to the resource provider A 609A. Similarly, the second estimated fraudster 620 can be connected to the resource provider B 609B, the resource provider C 609C, and the resource provider D 609D. The latent value network 606 can be a more accurate portrayal of the fraud network than the network data 602 which does not include the estimated fraudsters.

In some embodiments, the latent value network 606 can be stored as a degree matrix, which the processor computer 102 can multiply by a matrix including the latent values (also referred to as a matrix of weights) to determine values associated with each node in the latent value network 606. The resulting values can indicate the common set of rules for performing fraud for the estimated fraudsters. For example, the element of the degree matrix representing the first estimated fraudster 610 can be multiplied by the suitable element(s) in the matrix of latent values. The resulting value(s) can be compared to a list of values to determine a closest common set of rules for performing fraud.

In other embodiments, the common set of rules for performing fraud that can define an estimated fraudster can include any suitable rules. For example, the common set of rules include a pattern of escalating fraud from a fraudster as they become more confident using a stolen credit card. For example, the fraudster may first perform a first transaction for one dollar to ensure the stolen credit card works. The fraudster may then become more bold and purchase a digital asset with the stolen credit card. Then finally the fraudster may purchase an expensive item online and have it sent to a newly created address for a PO box. This pattern of escalating fraud may have been determined by the processing computer 102 using tensor factorization as described herein.

The latent value network 606 can then be used in future analyses to determine trends in fraud among fraudsters. For example, the processing computer 102 can determine that a few fraudsters are committing many fraudulent transactions rather than many fraudsters are committing a few fraudulent transactions each.

C. Request and Alert Processing

A processing computer can be capable of determining latent values from a multiplex graph comprising a plurality of network data. As a data store obtains new network data (e.g., from data capture computers), the processing computer can analyze the new network data to determine new latent values and, in some embodiments, can create and merge new model(s) with previous model(s).

In some embodiments, the processing computer can receive an event request message from a remote server computer. The event request message can include event data that the remote server computer is requesting the processing computer to analyze. The processing computer can run a requested model with the event data. The processing computer can then respond to the remote server computer with an event response message based on the output data generated by the model.

FIG. 7 shows a method of processing a request according to embodiments. The method illustrated in FIG. 7 will be described in the context of a processing computer analyzing a multiplex network comprising weather network data, car traffic network data, and communication traffic network data. It is understood, however, that the invention can be applied to other circumstances (e.g., fraud network data, attitude network data, voting network data, biodiversity network data, purchase network data, return network data, etc.). The method in FIG. 7 may be performed by a computer, for example the processing computer 102.

At step 702, the processing computer 102 may retrieve a plurality of network data from a data store 104. The network data may be in the form of data representing a multiplex graph. For example, the processing computer 102 can request the data from a database table or combination of tables stored in the data store 104. This data may be generated as results returned by Structured Query Language (SQL) and/or as pictorials, graphs or complex results (e.g., trend analyses from data-mining tools), and/or the like. In some embodiments, the processing computer 102 can retrieve an epoch of data from the data store 104. The epoch can corresponded to data within a predetermined timeframe. For example, an epoch may be 5 minutes, 2 hours, 3 days, etc.

For example, the processing computer 102 can retrieve a first epoch of data. The first epoch can be 1 day long. The processing computer 102 can retrieve the plurality of network data from the data store 104 that corresponds to and/or includes timestamps indicating that the plurality of network data is included in the first epoch (e.g., timestamps within the epoch of 3/19/2019 to 3/20/2019). In some embodiments, the plurality of network data may make up a multiplex graph as described herein, for example the multiplex graph of FIG. 5.

The processing computer 102 can retrieve weather network data, car traffic network data, and communication traffic network data. As an illustrative example, the weather network data can include wind speeds, temperatures, and pressures. The car traffic network data may include average car speeds, length of idle time, and car densities. The communication traffic network data may include communication durations, communication failure rates, communication channel types, and communication rates of particular machines.

At step 704, after querying the data store 104 for the plurality of network data, the processing computer 102 can run one or more deep learners to determine if a signal is present. A deep learner can be a machine learning process that can include a cascade of multiple layers of nonlinear processing units for feature extraction and transformation. Each successive layer can use the output from the previous layer as input. The deep learners can learn in any suitable manner. For example, the deep learners can learn in a supervised (e.g., classification, etc.) and/or an unsupervised (e.g., pattern analysis, clustering, etc.) manner.

The deep learners can include any suitable machine learning process. For example, the deep learners may be deep neural networks (DNN). A DNN can be an artificial neural network (ANN) which includes multiple layers between the input and output layers. The DNN can find a correct mathematical manipulation to turn the input into the output, whether it be a linear relationship or a non-linear relationship. The network can move through the layers calculating the probability of each output. For example, a DNN that is trained to recognize dog breeds can go over a given image of a dog and calculate the probability that the dog in the image is a certain breed. Each mathematical manipulation can be considered a layer, and complex DNNs can have many layers. For example, the DNN can be trained to decompose an image into features, identify trends that exist across all samples, and classify new images by their similarities without requiring human input. The extra layers in the DNN can enable composition of features from lower layers, potentially modeling complex data with fewer units than a similarly performing shallow network.

In some embodiments, the DNNs may be feedforward networks in which data flows from the input layer to the output layer without looping back. At first, the DNN can create a map of nodes and can assign random numerical values, or "weights," to connections between them. The weights and inputs can be multiplied and return an output between 0 and 1. If the network didn't accurately recognize a particular pattern, an algorithm can adjust the weights. That way the algorithm can make certain parameters more influential, until it determines the correct mathematical manipulation to fully process the data.

In other embodiments, the deep learners may be recurrent neural networks (RNNs), in which data can flow in any direction. RNNs may be used, for example, in applications such as language modeling. In yet other embodiments, the deep learners may be convolutional deep neural networks (CNNs).

In some embodiments, the deep learners can be tuned to overfit the data. Overfitting can occur when a model resulting from the deep learners achieves a good fit on the training data, but does not generalize well on new data that was not used to train the model. For example, the processing computer 102 can, during training of the deep learners with the network data, adjust many parameters as to overfit the model to the training data. The processing computer can overfit the data in order to determine if any trends emerge from the network data. By overfitting the data, the processing computer can easily determine that there is a possible trend.

As an example, the processing computer 102 can input the plurality of network data including the weather network data, the car traffic network data, and the communication traffic network data into the deep learner. The deep learner can cluster the input data into a plurality of clusters (i.e., community groups). Illustrative community groups can include a hurricane community group (e.g., from the weather network data), a car bottleneck location community group, a communication via cellular phone community group, an internet traffic community group, and the like. In some embodiments, a community group may include nodes from the weather network data and the car traffic network data. For example, a community group may be a severe weather driving condition community group.

As another example, the processing computer 102 can retrieve a plurality of network data comprising data associated with 1,000,000 interactions performed in the past 24 hours. The plurality of network data can be in a multiplex graph as shown in FIG. 5. The processing computer 102 can input the data associated with the 1,000,000 interactions into a deep learner. The deep learner can perform, for example, k-means clustering or other suitable process. K-means clustering can group similar data points together and discover patterns. The k-means clustering can be used as a feature learning step in the unsupervised learning process.

The output of the deep learner can be output data. Output data can include any data output by a machine learning model. For example, the output data may include a plurality of community groups determined by the deep learner(s). In some embodiments, the output data can be a plurality of classifications. In some embodiments, at step 704, while running the deep learners, the processing computer 102 can perform k-core decomposition to compress the plurality of network data. For example, k-core decomposition, based on a recursive pruning of the least connected nodes, allows for the processing computer 102 to disentangle the hierarchical structure of network data by progressively focusing on central cores (e.g., k-cores). The processing computer 102 can perform k-core decomposition as known to one of skill in the art. For further details regarding k-core decomposition see [Alvarez-Hamelin, Jose Ignacio, et al. "k-core decomposition: A tool for the visualization of large scale networks." arXiv preprint cs/0504107 (2005).], which is herein incorporated by references for all purposes.

At step 706, the processing computer 102 can determine whether or not a signal is present in the output of the deep learners (i.e., the output data). The processing computer 102 can compare the output data to previously determined output data to determine the signal. For example, the processing computer 102 can determine output data comprising a plurality of communities. The processing computer 102 can retrieve previously stored output data from the data store 104 or other suitable database. The previously stored output data may have been generated by the same deep learner(s) as the output data, and can also comprise a plurality of communities. The processing computer 102 can compare the plurality of communities from the output data and the previously stored output data. The processing computer 102 can determine the signal to be any suitable change in the output data. For example, the processing computer 102 can determine a change in community size (or other community characteristic(s)), such as a substantial increase in the size of a check fraud community.

In another example, the previous output data from the previous epoch may include a severe weather driving condition community group. During the current epoch, the processing computer 102 can also determine the severe weather driving condition community group from the weather network data, the car traffic network data, and the communication traffic network data. The severe weather driving condition community group can include data from the plurality of network data that relates to severe weather and driving conditions. For example, nodes from the plurality of network data that indicate a hurricane (e.g., high wind, high precipitation, etc.) and nodes that indicate congested and dangerous driving conditions (e.g., higher density of cars on the road, more reported accidents, etc.) can be included in the severe weather driving condition community group. Conversely, nodes in the plurality of network data that indicate sunny days with no traffic may not be included in the severe weather driving condition community group.

The severe weather driving condition community group from both epochs can be defined by a size of the community group (e.g., as measured from a centroid), a density of nodes in the community group, an equation approximating the edge of the community group, and/or other mathematical characteristics of the community group. The processing computer 102 can, for example, compare the size of the severe weather driving condition community group from the first epoch to the size of the severe weather driving condition community group of the second epoch. If there is a substantial change, as determined by any suitable predetermined criteria, then the processing computer 102 can determine that a signal is present. In this example, the signal may relate to a large increase in the severe weather driving condition community group. For example, the signal may be a flag, such as a "severe weather driving condition event."

This increase in the severe weather driving condition community group may be a result of a hurricane approaching south Florida. The combination of increased wind speeds, particular pressure patterns, increased car densities (e.g., as more drivers attempt to leave the area), increased communication rates over cellular phones, as well as an increase in cellular communication failure rates (e.g., as the hurricane adversely affects cellular communication capabilities).

In some embodiments, the processing computer 102 can determine that there is no signal present. For example, the processing computer 102 can determine that there is no difference between the output data and the previously determined output data. The processing computer 102 can then proceed to step 724 and query the data store 104 for the next epoch of data.

As another example, the output data determined by the deep learner at 704 may be referred to as current initial output data. The processing computer 102 can determine the current initial output data generated by one or more deep learners, where the one or more deep learners overfit the plurality of network data to determine the current initial output data. The current initial output data can comprise one or more community groups. The processing computer 102 can then compare the current initial output data to previously determined output data. The previously determined output data can be determined in the last epoch and can comprise previously determined community groups. The processing computer 102 can then, based on the comparing determine a signal, wherein the generating the matrices, below, is in response to the signal.

In some embodiments, at step 708, the processing computer 102 may route processing to a related processing computer based on the change in output data between epochs (i.e., the signal). The processing computer 102 can transmit the signal and the network data to a second processing computer.

For example, the processing computer 102 may determine a signal of "severe weather driving condition event." The processing computer 102 may route (i.e., transmit) the signal to a second processing computer. The second processing computer can be configured to process severe weather driving condition events in particular The second processing computer may perform steps 710-734. In other embodiments, the processing computer 102 can perform steps 710-734 rather than routing the processing to the second processing computer. The processing computer 102 can determine which computer to route the signal to using on a routing table. The use of multiple processing computers can be beneficial to spread workloads across a system. Each processing computer may specialize in processing a certain type of data.

At step 710, the processing computer 102 can then generate at least one adjacency matrix based on the plurality of network data. The processing computer 102 may generate the adjacency matrix based on the data, for example, if the processing computer 102 determines that the data indicates that a node is connected to another node via an edge, then the processing computer 102 can store the connection information into an adjacency matrix. For example, the adjacency matrix can include elements which can indicate whether pairs of vertices are adjacent or not in the graph. An example adjacency matrix is shown in FIG. 10 and described in further detail below.

The adjacency matrix can include information indicating that a node in a first network data is connected to a node in a second network data in the multiplex graph.

In some embodiments, the processing computer 102 can generate the adjacency matrix from a portion of the plurality of network data, based on the signal. For example, if the type of signal is "severe weather driving condition event," then the processing computer 102 can generate the adjacency matrix from the nodes in the severe weather driving event community group. In some embodiments, the processing computer 102 can generate the adjacency matrix from the full multiplex graph. In reference to FIG. 5, the processing computer 102 can generate an adjacency matrix from the first network data 502 rather than the multiplex graph 500. The processing computer 102 can generate the adjacency matrix to be n×n large, where n is the number of nodes, for example, in the severe weather driving event community group.

At step 712, after generating the at least one adjacency matrix, the processing computer 102 may perform tensor factorization on the adjacency matrix to obtain latent values in the plurality of network data. In some embodiments, tensor factorization may be performed using the Tucker model. The Tucker model may decompose a tensor into a set of matrices and one small core tensor. Tensor factorization is described in further detail in FIGS. 8 and 9 below. The latent values can be a result of tensor factorization. In some embodiments, the latent values may be included in a tensor, for example, in a rank 2 tensor.

As an example, the adjacency matrix can be input into the tensor factorization module 204D included in the processing computer 102. The adjacency matrix can be a rank 2 tensor. The processing computer 102 can factorize the adjacency matrix into a plurality of smaller tensors, which combined together can be equivalent to the adjacency matrix. At least one of the smaller tensors can include one or more latent values. For example, in some embodiments, at least one of the smaller tensors can include a rank 2 tensor that is of size m×m, where m<n. In other embodiments, the at least one of the smaller tensors may not be a square matrix, but may still include fewer elements than the adjacency matrix. For further details on tensor factorization as well as its application to latent variables can be found in, for example, [Kolda, Tamara G., and Brett W. Bader. "Tensor decompositions and applications." *SIAM review* 51.3 (2009): 455-500.], and [Rabanser, Stephen, et al. "Introduction to Tensor Decompositions and their Applications in Machine Learning" in ArXiv (2017)], which are herein incorporated by reference in their entirety for all purposes.

If the adjacency matrix was created based on the severe weather driving event community group, then at least one of the smaller tensors, resulting from tensor factorization, can include latent values relating to a latent variable of "expected water usage." The latent values can be, for example, 5 gallons, 10 gallons, 45 gallons, and 90 gallons, where each latent value may correspond to a different location in the area. These latent values may indicate expected water usage during the severe weather event. The expected water usage can indirectly depend on the weather network data (e.g., due to the hurricane), on the car traffic network data (e.g., due to the number of people able to leave the area), and on the communication traffic network data (e.g., due to the number of dropped phone calls thus indicating possibly worse damage from the hurricane). For example, predictions can be made as to the decrease in the population in different geographic areas and the potential duration of population decrease in response to the weather network data, the car traffic network data, and the communication traffic network data, and the communication traffic data. The decrease in the population can be used to predict water usage values over time and in specific geographic areas.

At step 714, after performing tensor factorization, the processing computer 102 can determine if the latent values satisfy a predetermined criterion. The predetermined criterion may be that the latent values are statistically relevant (e.g., above a threshold of statistical relevancy). The processing computer 102 can determine that the latent values are statistically relevant in any suitable manner, as described herein. For example, the processing computer 102 can compare the determined latent values to known historic values stored in a database to determine if the latent values are statistically relevant. In other embodiments, the processing computer 102 can compare, for example, 100 determined latent values ranging from 45 to 50 gallons relating to the latent variable of expected water usage, to historic values ranging from 45 to 50 gallons. The processing computer 102 can determine that the latent values are not statistically relevant since they are similar to the historical values and do not indicate any relevant change in expected water usage.

In yet other embodiments, the processing computer 102 can compare the determined latent values to one another. For example, the determined latent values may include 5 values relating to the latent variable of water usage. The latent values may be 45, 50, 52, 44, and 90 gallons. The processing computer 102 can determine that one of the latent values (e.g., 90 gallons), is approximately double the size of the other latent values, and determine that the latent value of 90 gallons is statistically relevant, but the latent values of 45, 50, 52, 44 gallons are not statistically relevant.

As another example, the processing computer 102 may determine the Cramer Rao bound associated with the latent values. The Cramer Rao bound may be a lower bound on the variance of unbiased estimators of a latent value. If the processing computer 102 determines that the latent values are statistically relevant, then the processing computer 102 can processed to step 716. If the processing computer 102 determines that the latent values are not statistically relevant (e.g., that the latent values are noise), then the processing computer 102 can proceed to steps 722 and 724.

In some embodiments, at step 716, after determining that the latent values satisfy the predetermined criterion, the processing computer 102 may normalize the latent values resulting from the previous steps. In some embodiments, the processing computer 102 may adjust the latent values to a notionally common scale. In some embodiments, the processing computer 102 can normalize the latent values using a Laplace distribution, as known to one of skill in the art. In some embodiments, the processing computer 102 can normalize the latent values using an ARIMA model as described herein.

The processing computer 102 can normalize the latent values to determine a high bound and a low bound of the latent values in order to make the latent values able to be more easily manipulated downstream. For example, at step 728, below, the processing computer 102 can input the normalized latent values into the model if the model accepts normalized values.

In some embodiments, at step 718, after normalizing the latent values, the processing computer 102 may sort the latent values by strength (i.e., size or intensity). For example, the processing computer 102 may have determined five different latent values of 100, 120, 110, 190, and 80 gallons associated with a latent variable of expected water usage. The processing computer 102 may sort the five signals by size (e.g., 80, 100, 110, 120, and 190 gallons). In some embodiments, the processing computer 102 can sort the latent values based on the relative value of the latent values to one another, where the relative values can be determined based on the normalization at step 716.

At step 720, after sorting the latent values, the processing computer 102 may determine if the latent values are suitable to input into a model. If there is at least one latent value that is suitable then the processing computer 102 may determine to proceed to step 728. If there are no latent values that are suitable then the processing computer 102 may determine to proceed to step 704 and run the next epoch.

In some embodiments, a latent value can be determined to be suitable if the latent value has properties that surpass a predetermined threshold. For example, the processing computer 102 can determine if one or more latent values are greater than a predetermined threshold. In some embodiments, the predetermined threshold can be a numerical threshold (e.g., 5, 10, 100, 9000, etc.) depending on the type of latent variables of the latent values. In other embodiments, the predetermined threshold can include determining whether or not a number (e.g., 2, 5, 10, 50, etc.) latent values were determined to be statistically relevant.

For example, the processing computer 102 may have a predetermined threshold of 100 gallons. The processing computer 102 can determine if the five latent values (e.g., 80, 100, 110, 120, and 190 gallons) are greater than 100 gallons. The latent values of 110, 120, and 190 gallons can be determined to be greater than the predetermined threshold. The predetermined threshold may be 100 gallons due to physical limitations of the water supply system, for example, the valves and pressures may in the pipes of the water supply system may not be able to direct amounts of water less than 100 gallons, therefore, the processing computer 102 can determine that these latent values (e.g., 80 and 100 gallons) are not suitable.

At steps 722 and 724, the processing computer 102 can query a data store for the next epoch of data. For example, the processing computer 102 can request the data from a database table or combination of tables stored in the data store 104. This data may be generated as results returned by Structured Query Language (SQL) and/or as pictorials, graphs or complex results (e.g., trend analyses from data-mining tools), and/or the like. The processing computer 102 may query any new data since the last epoch from the data store 104. In some embodiments, the processing computer 102 may determine if there is new data stored in the data store 104. If the processing computer 102 determines that there is new data stored in the data store 104, then the processing computer 102 may retrieve the new data from the data store 104.

In some embodiments, the processing computer 102 can throttle the number of queries made in a given amount of time. For example, the processing computer 102 can throttle the number of epochs in a day to 5 epochs, even if the length of an epoch is 2 hours.

At step 725, after determining whether or not one or more latent values are suitable to input into a model, the processing computer 102 can store latent values in the history database. The history database can store latent values determined in each epoch. In some embodiments, the processing computer 102, or other suitable computer, can train machine learning models with the stored latent values. In some embodiments, a computer can train a model as new latent values are stored in the history database.

At step 726, the processing computer 102 may determine which model to run based on the latent values. The models may be pre-stored in the data store 104. The processing computer 102 can store a table that relates types of latent variables and/or signals to one or more models. For example, the table may relate the signal of severe weather driving condition event to one or more severe weather driving condition models. In other embodiments, the table can relate the latent variable of expected water usage to an expected water usage model In some embodiments, the processing computer 102 can determine one or more models that, in some embodiments, can feed into one another. The processing computer 102 can retrieve the model(s) from the history database in any suitable manner.

In other embodiments, the processing computer 102 can determine that no model is associated with the determined latent values. The processing computer 102 can then generate and transmit an alert indicating "no relevant mode" to a subject matter expert who can review the latent values.

At step 728, the processing computer 102 can input the latent values into the model. The model can generate output data, which can include any suitable output data as described herein. For example, the output data can be a course of action (e.g., alert remote server computer about high check fraud rates on Tuesdays, contact a user about increasing investment amounts, update user index tables, take additional security steps, offer an opportunity to a user, and/or any other suitable action). In some embodiments, the processing computer 102 can input the latent values into a behavior tree to determine output data.

As another example, the processing computer 102 can input the latent values of 110, 120, and 190 gallons, corresponding to the latent variable of expected water usage, into an expected water usage model. The expected water usage model can determine output data which can include, for example, an efficient way to route water through the water supply system so that the locations expecting increased water usage can get access to the necessary water during the hurricane. The output data can include a map/list of valves in the water supply system, where each valve can have an open/closed value (e.g., 0 for closed, 1 for open).

At steps 730 and 732, the processing computer 102 can determine which remote server computer to communicate with based on the output data. For example, the output data may expected water usage. The processing computer 102 can select a remote server computer also associated with the expected water usage. In some embodiments, the output data can indicate which remote server computer to initiate communication with. For example, the output data can indicate a remote server computer to contact (e.g., from a behavior tree).

At step 734, the processing computer 102 can generate an alert comprising the output data. The processing computer 102 can transmit the alert to a remote server computer. The processing computer 102 can retrieve any suitable data regarding communication with the remote server computer (e.g., IP addresses, communication channel type, etc.).

For example, the processing computer 102 can determine a water valve control computer as the remote server computer. The processing computer 102 can automatically issue instructions to the water valve control computer to adjust the valves in the water supply system as outlined in the output data in preparation of the hurricane making landfall so that safe drinking water can be provided to the appropriate locations.

In some embodiments, at step 736, a remote server computer 106 may transmit an event request message to the processing computer 102. The event request message comprise event data. For example, the event may be an event between the operator of the remote server computer 106 and an individual. For example, the event may be an individual requesting to perform a wire transfer. The event request message may comprise a request to run a particular model (e.g., a wire transfer risk model). The event request message may be routed from the remote server computer 106 to the processing computer 102 via the model router 110. In some embodiments, the event data can comprise user data and data regarding an event associated with the user.

At steps 738 and 740, after receiving the event request message, the processing computer 102 may run the requested model. The processing computer 102 can retrieve the requested model from the history database. In this way, the processing computer 102 can run the same model for a signal through steps 702-734 as the model at step 740.

The processing computer 102 may generate an event response message based on the model results (i.e., output data). The processing computer 102 may then transmit the event response message to the remote server computer 106 via a response router 108. The remote server computer 106 may receive the response from the processing computer 102. In some embodiments, the remote server computer 106 may perform additional processing based on the response. For example, the remote server computer 106 may authorize a wire transfer based on the response.

For example, the processing computer 102 can receive, from the remote server computer 106, an event request message comprising event data. The processing computer can then determine a second model based on the latent values and the first model, and being associated with the event data. The processing computer 102 can then retrieve the second model from the database and can then run the second model on the event data to determine second output data. The processing computer 102 can then generate an event response message comprising the second output data and transmit the event response message to the remote server computer.

In some embodiments, additional processing can include the remote server computer 106 denying the wire transfer, performing further security analysis (e.g., asking for identification from the party attempting the wire transfer), offering additional processes associated and/or related to the wire transfer.

In other embodiments, additional processing can include the remote server computer 106 performing fraud analysis, opening and/or closing water system valves, generating documents, and/or the like based on the received event response message.

In yet other embodiments, after performing steps 702-734, the processing computer 102 can query the data store for another plurality of network data since another epoch of data. The processing computer 102 can then again perform steps 704-734. For example, the processing computer 102 can generate another matrices based on another plurality of network data and can then perform tensor factorization on the another matrices to obtain another set of latent values in the another plurality of network data. The processing computer 102 can then determine that the another set of latent values satisfy the predetermined criterion or another predetermined criterion. For example, the predetermined criterion may be the same predetermined criterion as the previous epoch or may be a different predetermined criterion. The processing computer 102 can then input the latent values into another model, wherein the another model generates another output data. The processing computer 102 can then generate a subsequent alert comprising the another output data and then transmit the subsequent alert to the remote server computer.

D. Latent Space Model for Dynamic Multiplex Network with Latent Nodes

The processing computer 102 can determine latent values from a multiplex graph comprising a plurality of network data. For example, the processing computer 102 can determine a number of latent values corresponding to fraudulent parties. FIG. 8 shows a latent space model for a dynamic multiplex network with impostor vertices using three-way tensor factorization according to an embodiment of the invention. The method illustrated in FIG. 8 will be described in the context of the processing computer 102 determining a latent fraud network. It is understood, however, that the invention can be applied to other circumstances (e.g., latent happiness networks, voting prediction networks, probability density of an event networks, etc.). The method illustrated in FIG. 8 can be performed in FIG. 7 during steps 710-714.

At step 810, the processing computer 102 may query a data store for a weighted multiplex graph comprising a plurality of network data. In some embodiments, the weighted multiplex graph may be the multiplex graph as shown in FIG. 5, as described herein. The processing computer 102 can query the data store in any suitable manner as described in detail herein.

At step 820, the processing computer 102 may generate matrices for the purchase network and the returns network. The processing computer 102 may generate any number of other matrices depending on the signal previously determined by the processing computer 102 (e.g., at steps 704-706).

At step 821, the processing computer 102 may generate a weighted adjacency matrix. An adjacency matrix may be a matrix that indicates whether pairs of nodes are adjacent or not in the multiplex graph. In some embodiments, the adjacency matrix may be a square matrix. For example, a graph may include the graph 1000 shown in FIG. 10. For example, the graph 1000 includes nodes 1, 2, 3, 4, 5, and 6 as well as 8 edges. The processing computer 102 can generate the adjacency matrix 1010 based on the graph 1000. The adjacency matrix 1010 can have the coordinates of 1-6. For example, the first row and column correspond to node 1, the second row and column correspond to node 2, the third row and column correspond to node 3, etc. The first element (0,0) in the adjacency matrix 1010 is a 2 since the first node is connected to the first node 2 times. The element at position (6,4) corresponds to the number of edges that connect nodes 6 and 4, which is equal to 1.

At step 822, after generating the adjacency matrix, the processing computer 102 may generate a normalized Laplacian matrix. A Laplacian matrix can be a matrix representation of a graph. The processing computer 102 can generate a Laplacian matrix based on the adjacency matrix, as well as a degree matrix. In some embodiments, the processing computer 102 may also generate a degree matrix. A degree matrix may be a matrix that contains information about the degree of each node. The degree of a node can be the number of edges connected to the node. In some embodiments, the degree matrix may be a diagonal matrix. In some embodiments, a degree matrix D and an adjacency matrix A may be used to determine a Laplacian matrix L of a graph. For example, $L=D-A$.

For example, the processing computer 102 can generate the degree matrix 1020 shown in FIG. 10 based on the graph 1000. Each element in the degree matrix 1020 indicates the number of edges connected to a given node. For example, node 5 is connected to 3 edges in graph 1000. Thus, in the degree matrix 1020, at position (5,5), the element is equal to 3.

The processing computer 102 can then generate the Laplacian matrix 1030 based on the adjacency matrix 1010 and the degree matrix 1020. For example, the processing computer 102 can subtract the adjacency matrix 1010 from the degree matrix 1020, element-wise, to obtain the Laplacian matrix 1030. In some embodiments, the processing computer 102 can also normalize the Laplacian matrix 1030 as known to one of skill in the art.

At step 823, after calculating the Laplacian matrix, the processing computer 102 may determine if it is necessary to perform feature collapse. Feature collapse can include collapsing the network data into smaller graphs of condensed information. For example, the processing computer 102 can collapse the network data from 1,000 nodes to 100 nodes, where each of the new 100 nodes represents multiple similar nodes of the network data. In some embodiments, the processing computer 102 can perform K-core decomposition to perform feature collapse, as known to one of skill in the art. The processing computer 102 may perform the feature collapse in steps 823A and 823B. At step 823A and 823B, the processing computer 102 may perform the feature collapse using a newly determined degree matrix and a community matrix (e.g., determined using K-core decomposition).

Feature collapse may decrease the number of total nodes in the network data, thus improving downstream computation times, while retaining accuracy of the data. The processing computer 102 can perform K-core decomposition on the network data to reduce the number of nodes. For example, the network data may be purchase network data including nodes representing resource providers as well as nodes representing users (i.e., consumers). The edges connecting the user nodes to the resource provider nodes can indicate an interaction between the two, such as a transaction. In some embodiments, to find a k-core graph, the processing computer 102 can to remove the nodes that have degree less than k, which may be predetermined (e.g., 2, 3, 5, etc.). The processing computer 102 can determine a new degree matrix based on the removed nodes, since removing nodes will also remove edges connected to the removed nodes.

In some embodiments, the processing computer 102 can decrease the number of total nodes by combining similar nodes. For example, if multiple nodes have similar characteristics (e.g., resource provider nodes indicating various store locations of a franchise), the processing computer 102 can combine these nodes into one node (i.e., a core node).

In some embodiments, at step 830, the processing computer 102 may generate a latent fraud network by performing steps 831-836, below. In some embodiments, the processing computer 102 may generate the purchase network and returns network (e.g., at step 820) and may generate the latent fraud network (e.g., at step 830) concurrently. In some embodiments, the processing computer 102 can create the latent network based on previously determined latent values. For example, the processing computer 102 can retrieve previously determined latent values from the history database, as described herein.

At step 831, 831A, and 831B, the processing computer 102 may generate an adjacency matrix, which may be weighted, and may generate a normalized Laplacian matrix for each attribute in the fraud network, such as resource provider name, resource provider type, zip code, etc. Steps 831A and 831B may be similar to steps 821 and 822, respectively.

At step 832, after generating the adjacency matrix and the Laplacian matrix for each network attribute, the processing computer 102 may perform tensor factorization, as described in detail herein.

At step 833, the processing computer 102 may rebuild the graph associated with the latent fraud network using latent fraudsters as connectors. For example, the processing computer 102 can determine latent values using tensor factorization as described herein. The determined latent variables may be, for example, estimated fraudsters associated with any suitable latent values representing the estimated fraudsters. For example, the latent values can include a zip code of "94608," a fraud method of "1" (indicating credit card fraud), a fraud rate of "2 attempts per day," and/or expected fraudulent purchases of "electronics" and "jewelry." The processing computer 102 can then include the latent values into the multiplex graph as nodes (i.e., rebuild the multiplex graph). The rebuilt graph can be similar to the latent value network 606 described in FIG. 6.

At step 834, after including the latent values into the network data, the processing computer 102 may calculate a weighted adjacency matrix for the rebuilt graph which includes the latent values. This step may be similar to steps 821 and 831A. At step 835, the processing computer 102 may calculate a normalized Laplacian matrix. This step may be similar to steps 822 and 831B.

At step 836, 836A, and 836B, the processing computer 102 may determine if it is necessary to perform a feature collapse. The processing computer 102 may perform the feature collapse in steps 836A and 836B. These steps may be similar to steps 823, 823A, and 823B.

In some embodiments, between steps 830 and 840, the processing computer 102 can filter the latent network for data to be further evaluated. For example, the processing computer 102 can determine to perform tensor factorization at step 840 on a subgraph of the latent network created at step 830.

At step 840, after creating the relevant matrices in steps 820 and 830, the processing computer 102 may perform tensor factorization on the matrices representing the network data and the matrix representing the latent network. The matrix representing the network data and the matrix representing the latent network can be a part of a multiplex graph, as described herein. The processing computer can then perform tensor factorization upon an adjacency matrix of the multiplex graph. The processing computer 102 can perform tensor factorization, as described herein, on the matrices representing the network data and the latent network (e.g., the adjacency matrices and/or matrices derived therefrom). The output of the tensor factorization 840 can include latent values.

In some embodiments, the processing computer 102 can perform tensor factorization on the degree matrix 823A, the community matrix 823B, the degree matrix 836A, and the community matrix 836B separately (i.e., perform tensor factorization four times, once per matrix). Tensor factorization on each matrix may result in different latent values.

The latent values determined after performing tensor factorization 832 may be statistically relevant values. Then, performing tensor factorization at 840, taking the generated latent network into account with the network data, can yield the same latent variables, but small latent values (i.e., not statistically relevant). If the first latent values determined at step 832 are statistically relevant, while the second latent values determined at step 840 are not statistically relevant, then the processing computer 102 has correctly identified the first latent values, since taking them into account yields, via tensor factorization, not statistically relevant values.

In other embodiments, the processing computer 102 can combine the matrix representing the network data and the matrix representing the latent network. For example, a latent fraudster in the matrix representing the latent network can connect to other nodes in the multiplex graph, such as, a weather node indicating sunshine, a resource provider node indicating the resource provider at which the fraud occurred, etc.

For example, the latent variable determined from tensor factorization may be next estimated fraudster fraud attempts. The latent values corresponding to the latent variable may include, for example, a timestamp and/or a location. Since the input plurality of network data to the tensor factorization step (840) included a latent fraud network as well as purchase network data and returns network data, the processing computer 102 can determine these next estimated fraudster fraud attempts as there may be latent trends in the plurality of network data. As an illustrative example, a latent trend may be that a fraudster may typically attempt fraudulent purchases of jewelry from high end retail stores with stolen credit cards in downtown San Francisco between the hours of 12:30 PM to 1:00 PM (their lunch break at work). The latent values determined by the processing computer 102 can include a next estimated fraudster fraud attempt of "12:45 PM" in the zip code "94111."

Performing tensor factorization on the determined latent network (e.g., latent fraudster network), can lead to improved decision making and accuracy on future estimated fraud. This is due to the fact that the processing computer 102 determines latent values from both the plurality of network data as well as the latent network indicating latent fraudsters.

At step 850, the processing computer 102 can then determine if the latent values are statistically relevant as described herein, for example, as described at step 714 in FIG. 7.

In some embodiments, the processing computer 102 can perform tensor factorization on the adjacency matrix generated from the multiplex graph and then determine whether or not the resulting latent values are statistically relevant using prior models. FIG. 9 shows a tensor factorization process according to an embodiment of the invention. The method illustrated in FIG. 9 will be described in the context of a determining latent values in a weighted multilayered network comprising purchase network data, returns network data, and fraud network data. It is understood, however, that the invention can be applied to other circumstances (e.g., weather network data, economic network data, location network data, etc.). Steps 910-923B are similar to steps 810-823B described in FIG. 8 above and will not be repeated here.

At step 930, the processing computer 102 may use prior community group characteristics (e.g., size of the community, shape of the community, etc.) when performing the feature collapse. The prior community group attributes may be community group characteristics previously determined by the processing computer 102 and stored in the data store 104. Step 940 is similar to step 840 described above and will not be repeated here. At step 950 and 960, the processing computer 102 may use prior models when calculating if the latent values are statistically relevant. For example, the processing computer 102 can determine a Cramer Rao bound, which can be a lower bound on the variance of unbiased estimators of a latent value to determine whether or not the latent values are statistically relevant.

III. Use Cases

The use cases below provide some examples of the information that latent values can provide. The system can continuously monitor user activity, included in the plurality of network data, to determine whether events indicate a life change that warrants issuing an alert to the remote server computer. In some embodiments, the processing computer can issue alerts to remote server computers based on determined latent values. In other embodiments, the processing computer can receive an event request message comprising event data from the remote server computer, input the event data into model(s) trained in part with latent values, and transmit an event response message comprising output data to the remote server computer.

The processing computer 102 may determine to transmit an alert to the remote server computer based on determined latent values. In some embodiments, the processing computer 102 can transmit the alert to any suitable device (e.g., user devices, resource provider computers, third-party computers, etc.).

As an example, the plurality of network data can include data related to a user (e.g., living location, work location, spending habits, commute habits, etc.) The processing computer can run one or more deep learners on the plurality of network data. The processing computer can determine whether or not a signal is present in the network data by comparing the output data of the deep learners to previously determined output data. The signal can be, for example, a general increase in spending habits. The processing computer can then generate relevant adjacency matrices (e.g., from community groups associated with the signal, or from the full multiplex graph) and perform tensor factorization to determine latent values. The determined latent values can be a value of "$700," which can correspond to a latent variable of estimated increase in car repair expenditures. The estimated increase in car repair expenditures may result from the data of the user's car getting older, the user spending more per month, the average lifespan of the user's model of car, etc. The processing computer can then input the latent values into a model, such as a model which may determine whether or not the user is qualified for an auto loan. The processing computer can then generate and transmit an alert indicating a remote server computer to contact the user about an auto loan, since the user's car repair expenditures are estimated to increase greatly over the next 2-3 months.

In some embodiments, the plurality of network data can include user community affiliation, user perceived demographics (e.g., age, gender, income, etc.), resource provider's community demographics, user/resource provider's relative network size, and/or user/resource provider's network/demographics stability. The processing computer can determine any suitable latent values from the plurality of network data. For example, the latent values can include demographic data (e.g., inferred home zip, etc.), attitudinal/preference based data (e.g., percentile rank of spend at restaurants (fast casual dining, fine dining, QSR, etc.), etc.), activity propensity data (e.g., propensity of premium airline travel, propensity to use digital wallet, propensity of using card for small ticket transactions, etc.), and card profile data (e.g., likelihood to be a small business owner, etc.). In some embodiments, the processing computer 102 may also determine latent values associated with an individual's lifestyle. For example, the processing computer 102 can determine that a user typically is associated with a first community (e.g., sports), but in more recent data, the user is associated with a second community (e.g., literature) and the change in the user's lifestyle can be attributed to one or more latent values.

As an example of determining latent values associated with a user's lifestyle, the processing computer 102 can process data associated with the user. In a first epoch, the plurality of network data can include user data such as an age (e.g., early 30s), living location (e.g., lives in the Boston West End area), transportation data (e.g., does not own a car), work location (e.g., works in Downtown Crossing), spending habits and/or any other suitable information regarding the user. The processing computer can run deep learners on the plurality of network data. The deep learners can output a number of community groups that the user belongs to. For example, the user may belong to a high end technology user community, an Italian food lover community, and an urban dwellers community.

In a second epoch, the plurality of network data can include data after a life event for the user. A life event may include an event in the user's life (e.g., moving, purchasing large items such as a house, marriages, promotions, etc.). In some embodiments, a life event may be a type of signal determined by the deep learners, as described herein. For example, between two epochs of network data, the user's data (e.g., location, marital status, housing status, employment, etc.) may substantially change and be determined to be a signal. The plurality of network data in the second epoch can also include user data such as an age, living location, transportation data, work location, spending habits and/or any other suitable information regarding the user. The processing computer 102 can run deep learners on the plurality of network data to determine output data. For example, the deep learners can output a number of community groups, including a high end technology user community, an Italian food lover community, and a suburb commuters community.

The processing computer can compare the output data (e.g., community groups) determined in the first epoch to the output data determined in the second epoch. The processing computer can determine that the user is no longer a part of the urban dwellers community and is now a part of the suburb commuters community. This may occur for a number of reasons, for example, the user may have moved from Boston to California due to a job change and now works in Mountain View, CA and lives in South San Jose, CA The signal determined by comparing the output data from subsequent epochs can be "change in community group," "moved across the country," moved," and/or any other signal indicating the change in the plurality of network data.

The processing computer can then generate an adjacency matrix based on the network data and perform tensor factorization on the adjacency matrix to determine latent values. The determined latent values can include, for example, distances between the user's residential location and office location, chance that the user will purchase a car in the next 3 months (e.g., 80%), and/or any other suitable latent values.

After determining the latent values, the processing computer can then input the latent values into a model. For example, the model may be an auto loan qualification model since the latent values indicate a 80% chance that the user will attempt to purchase a car in the next 3 months. In this case, the processing computer can automatically initiate an auto loan qualification model if the chance that the user will attempt to purchase a car in the next 3 months is greater than 50% (or other threshold value). The model can generate output data, which may be a decision to contact the user regarding an auto loan, a risk score, etc. The processing computer can then generate and transmit an alert comprising the output data to a remote server computer, which can contact the user regarding the auto loan.

The processing computer can initiate any suitable processing after determining the output data. For example, the processing computer can determine a make and model of a car that is both consistent with the user's previous car purchase (e.g., determine a truck if the user typically purchase trucks) as well as a price range for the car based on the user's salary.

As another example, the processing computer can generate documents based on the output data as well as other user data included in the plurality of network data. For example, the processing computer can generate an auto loan offer document and may fill in any text spaces in a template with data including the user's name, the user's address, the current date and time, as well as a prequalified loan amount. After generating the documents, the processing computer can transmit the documents to a remote server computer and/or the user.

Further, in some embodiments, the processing computer can receive event data from a remote server computer. The processing computer can input the event data into a relevant model, which may have been trained in part with latent values.

For example, a remote server computer can transmit an event request message comprising event data to the processing computer. The event may include a user adding pictures to their social networking application of choice. The event data can include the images that the user is attempting to publish. The remote server computer can transmit the event request message comprising the images as well as any other suitable data (e.g., username, data, time, location, image source device identifier, etc.). In some embodiments, the remote server computer can also request a particular model for the processing computer to run (e.g., "model #3052," "image model," etc.).

Upon receiving the event request message comprising the event data, the processing computer can determine which model to run. For example, the processing computer can determine that the event data is in an image format (e.g., png, jpeg, etc.) and determine to run the model associated with image data (e.g., the image model). If the remote server computer included a request for a particular model in the event request message (e.g., "model #3052), then the processing computer run the selected model. The processing computer can input the event data (e.g., the images) into the image model. The image model can generate output data which may include, for example, classifications of what is in the images, an indication of whether or not the images satisfy a profanity filter, etc. The processing computer can then generate and transmit an event response message comprising the output data to the remote server computer. The remote server computer can then perform additional processing. For example, the remote server computer can determine whether or not to block the images based on the output data.

Embodiments of the invention provide for a number of advantages. For example, a variety of latent values can be determined from a plurality of network data. The latent values can be used to further train models to further improve predictions.

Additionally, embodiments of the invention allow for the determination of consecutive latent values in a set of data. The processing computer can use consecutive latent values to update models in real time with not directly observed data.

An additional advantage includes the processing computer using deep learners which may act as adaptive filters. For example, the deep learners can determine many different types of signals when evaluating the plurality of network data in a holistic manner, rather than evaluating the network data using hard coded (i.e., static) filters. Static filters can be problematic, because static filters are relatively inflexible and they may fail to identify relevant, but subtle, trends in a data set. Embodiments of the invention allow for a server computer to determine many different types of signals when processing the plurality of network data. As such, thousands of static filters do not need to be created for every possible trend. The server computer can determine signals in the plurality of network data which can include signals not directly predicted (i.e., initially unknown trends), and thus not discoverable by a static filter.

Embodiments of the invention provide for additional advantages. For example, the processing computer can overfit the data with the deep learners to determine strong signals between epochs of data. For example, overfitting the data can ensure that the deep learners can determine changes in output data between epochs. Overfitting the deep learners leads to stronger signals because the overfit deep learners don't try to generalize the output data from an epoch to be predictive of future epochs, thus allowing changes in the output data to be more prominent.

Although the steps in the flowcharts and process flows described above are illustrated or described in a specific order, it is understood that embodiments of the invention may include methods that have the steps in different orders. In addition, steps may be omitted or added and may still be within embodiments of the invention.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
querying, by a processing computer, a data store for a plurality of network data in a first epoch;
determining, by the processing computer, a presence of a signal in the plurality of network data based on comparing network data queried in the first epoch to network data obtained in a previous epoch;
generating, by the processing computer, in response to successfully determining the presence of the signal, matrices based on the plurality of network data;
performing, by the processing computer, tensor factorization on the matrices to obtain latent values in the plurality of network data;
determining, by the processing computer, that the latent values satisfy a predetermined criterion;
inputting, by the processing computer, the latent values into a first model, wherein the first model generates output data;

generating, by the processing computer, an alert comprising the output data;

determining, by the processing computer, a remote server computer of a plurality of remote server computers based on the output data;

transmitting, by the processing computer, the alert to the remote server computer;

receiving, by the processing computer from the remote server computer, an event request message comprising event data;

determining, by the processing computer, a second model based on the latent values and the first model, and being associated with the event data;

retrieving, by the processing computer, the second model from a database;

running, by the processing computer, the second model on the event data to determine second output data;

generating, by the processing computer, an event response message comprising the second output data; and transmitting, by the processing computer, the event response message to the remote server computer.

2. The method of claim 1, wherein the matrices are adjacency matrices, and wherein after performing tensor factorization, the method further comprises:

determining, by the processing computer, whether or not the latent values are statistically relevant.

3. The method of claim 1, wherein the remote server computer performs additional processing based on the alert, and wherein the method further comprises:

querying, by the processing computer, the data store for another plurality of network data since another epoch of data;

generating, by the processing computer, another matrices based on the another plurality of network data;

performing, by the processing computer, tensor factorization on the another matrices to obtain another set of latent values in the another plurality of network data;

determining, by the processing computer, that the another set of latent values satisfy the predetermined criterion or another predetermined criterion;

inputting, by the processing computer, the latent values into another model, wherein the another model generates another output data;

generating, by the processing computer, a subsequent alert comprising the another output data; and transmitting, by the processing computer, the subsequent alert to the remote server computer.

4. The method of claim 1, wherein the output data is subsequent output data, and after querying and before generating the matrices, the method further comprises:

determining, by the processing computer, current initial output data generated by one or more deep learners, wherein the one or more deep learners overfit the plurality of network data to determine the current initial output data, wherein the current initial output data comprises one or more community groups;

comparing, by the processing computer, the current initial output data to previously determined output data, wherein the previously determined output data is determined in the last epoch and comprises previously determined community groups; and based on the comparing, determining, by the processing computer, a signal, wherein the generating the matrices is in response to the signal.

5. The method of claim 1 further comprising:

normalizing, by the processing computer, the latent values.

6. The method of claim 1, wherein the predetermined criterion is a threshold of statistical relevancy.

7. The method of claim 1 further comprising:

determining, by the processing computer, the first model of a plurality of models stored in the data store, wherein the first model is associated with at least a portion of the plurality of network data.

8. A processing computer comprising:

a processor;

a memory device; and a computer-readable medium coupled to the processor, the computer-readable medium comprising code executable by the processor for implementing a method comprising:

querying a data store for a plurality of network data in a first epoch;

determining a presence of a signal in the plurality of network data based on comparing network data queried in the first epoch to network data obtained in a previous epoch;

generating, in response to successfully determining the presence of the signal, matrices based on the plurality of network data;

performing tensor factorization on the matrices to obtain latent values in the network data;

determining that the latent values satisfy a predetermined criterion;

inputting the latent values into a first model, wherein the first model generates output data;

generating an alert comprising the output data;

determining a remote server computer of a plurality of remote server computers based on the output data;

transmitting the alert to the remote server computer, wherein the remote server computer performs additional processing based on the alert;

receiving, by the processing computer from the remote server computer, an event request message comprising event data;

determining, by the processing computer, a second model based on the latent values and the first model, and being associated with the event data;

retrieving, by the processing computer, the second model from a database;

running, by the processing computer, the second model on the event data to determine second output data;

generating, by the processing computer, an event response message comprising the second output data; and transmitting, by the processing computer, the event response message to the remote server computer.

9. The processing computer of claim 8, wherein the matrices are adjacency matrices, and wherein after performing tensor factorization, the method further comprises:

determining whether or not the latent values are statistically relevant.

10. The processing computer of claim 8, wherein the remote server computer performs additional processing based on the alert, and wherein the method further comprises:

querying the data store for another plurality of network data since another epoch of data;

generating another matrices based on the another plurality of network data;

performing tensor factorization on the another matrices to obtain another set of latent values in the another plurality of network data;

determining that the another set of latent values satisfy the predetermined criterion or another predetermined criterion;

inputting the latent values into another model, wherein the another model generates another output data;

generating a subsequent alert comprising the another output data; and transmitting the subsequent alert to the remote server computer.

11. The processing computer of claim 8, wherein the output data is subsequent output data, and after querying and before generating the matrices, the method further comprises:

determining current initial output data generated by one or more deep learners, wherein the one or more deep learners overfit the plurality of network data to determine the current initial output data, wherein the current initial output data comprises one or more community groups;

comparing the current initial output data to previously determined output data, wherein the previously determined output data is determined in the last epoch and comprises previously determined community groups; and based on the comparing, determining a signal, wherein the generating the matrices is in response to the signal.

12. The processing computer of claim 8, wherein the method further comprises:

normalizing the latent values.

13. The processing computer of claim 8, wherein the predetermined criterion is a threshold of statistical relevancy.

14. The processing computer of claim 8, wherein the method further comprises:

determining the first model of a plurality of models stored in the data store, wherein the first model is associated with at least a portion of the plurality of network data.

* * * * *